(12) United States Patent
Zhang et al.

(10) Patent No.: US 11,159,870 B2
(45) Date of Patent: Oct. 26, 2021

(54) ACOUSTIC OUTPUT APPARATUS

(71) Applicant: SHENZHEN VOXTECH CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN VOXTECH CO., LTD., Shenzhen (CN)

( * ) Notice: Subject to any disclaimer, the term of this patent is extended or adjusted under 35 U.S.C. 154(b) by 0 days.

(21) Appl. No.: 17/170,936

(22) Filed: Feb. 9, 2021

(65) Prior Publication Data
US 2021/0168495 A1 Jun. 3, 2021

Related U.S. Application Data

(63) Continuation of application No. PCT/CN2019/130884, filed on Dec. 31, 2019.

(30) Foreign Application Priority Data

Apr. 30, 2019 (CN) .......................... 201910364346.2
Sep. 19, 2019 (CN) .......................... 201910888067.6
Sep. 19, 2019 (CN) .......................... 201910888762.2

(51) Int. Cl.
*H04R 1/10* (2006.01)
*G06F 3/16* (2006.01)
(Continued)

(52) U.S. Cl.
CPC .............. *H04R 1/1016* (2013.01); *G06F 3/16* (2013.01); *G06F 3/162* (2013.01); *G06F 3/165* (2013.01);
(Continued)

(58) Field of Classification Search
CPC . H04R 1/02; H04R 1/026; H04R 1/10; H04R 1/22; H04R 1/24; H04R 1/26;
(Continued)

(56) References Cited

U.S. PATENT DOCUMENTS 5,327,506 A 7/1994 Stites, III
6,062,337 A 5/2000 Zinserling
(Continued)

FOREIGN PATENT DOCUMENTS

CN 1270488 A 10/2000
CN 1783903 A 6/2006
(Continued)

OTHER PUBLICATIONS

International Search Report in PCT/CN2019/130880 dated Apr. 1, 2020, 6 pages.
(Continued)

*Primary Examiner* — Thang V Tran
(74) *Attorney, Agent, or Firm* — Metis IP LLC

(57) ABSTRACT

The present disclosure provides an acoustic output apparatus. The acoustic output apparatus includes at least one low-frequency acoustic driver that outputs sounds from at least two first sound guiding holes, at least one high-frequency acoustic driver that outputs sounds from at least two second sound guiding holes, and a support component. The support component may be configured to support the at least one high-frequency acoustic driver and the at least one low-frequency acoustic driver, and cause the at least two first sound guiding holes and the at least two second sound guiding holes to locate away from a position of an ear of a user.

20 Claims, 12 Drawing Sheets

(51) Int. Cl.
| | |
|---|---|
| *H04R 3/00* | (2006.01) |
| *H04R 1/20* | (2006.01) |
| *H04R 1/02* | (2006.01) |
| *H04R 1/26* | (2006.01) |
| *H04R 1/44* | (2006.01) |
| *H04M 1/03* | (2006.01) |
| *H04M 1/78* | (2006.01) |
| *H04R 1/24* | (2006.01) |
| *H04R 1/28* | (2006.01) |
| *H04R 3/02* | (2006.01) |
| *H04R 1/34* | (2006.01) |
| *H04W 4/80* | (2018.01) |
| *H04R 1/22* | (2006.01) |
| *H04R 5/02* | (2006.01) |
| *G10L 21/038* | (2013.01) |
| *H04R 5/033* | (2006.01) |
| *H04S 7/00* | (2006.01) |

(52) U.S. Cl.
CPC ............ *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/10* (2013.01); *H04R 1/105* (2013.01); *H04R 1/1008* (2013.01); *H04R 1/1075* (2013.01); *H04R 1/1083* (2013.01); *H04R 1/22* (2013.01); *H04R 1/24* (2013.01); *H04R 1/26* (2013.01); *H04R 1/28* (2013.01); *H04R 1/2803* (2013.01); *H04R 1/34* (2013.01); *H04R 1/342* (2013.01); *H04R 1/345* (2013.01); *H04R 1/347* (2013.01); *H04R 1/44* (2013.01); *H04R 3/00* (2013.01); *H04R 3/02* (2013.01); *H04R 5/02* (2013.01); *H04R 5/033* (2013.01); *H04S 7/304* (2013.01); *H04W 4/80* (2018.02); *H04R 2420/07* (2013.01); *H04S 2400/11* (2013.01)

(58) Field of Classification Search
CPC ... H04R 1/28; H04R 1/34; H04R 1/44; H04R 1/105; H04R 1/1008; H04R 1/1016; H04R 1/1075; H04R 1/1083; H04R 1/2803; H04R 1/342; H04R 1/345; H04R 1/347; H04R 3/00; H04R 3/02; H04R 5/00; H04R 5/02; H04R 5/033; H04R 9/06; H04R 2420/07; G10L 21/038; H04S 7/304; H04S 2400/11; G06F 3/16; G06F 3/165; G06F 3/162; H04M 1/03; H04M 1/035; H04M 1/178; H04W 4/80; G02C 11/00

See application file for complete search history.

(56) References Cited

U.S. PATENT DOCUMENTS

| | | |
|---|---|---|
| 6,817,440 B1 | 11/2004 | Kim |
| 9,985,596 B1 | 5/2018 | Litovsky et al. |
| 2006/0098829 A1 | 5/2006 | Kobayashi |
| 2006/0113143 A1 | 6/2006 | Ishida |
| 2006/0262954 A1 | 11/2006 | Lee et al. |
| 2007/0098198 A1 | 5/2007 | Hildebrandt |
| 2007/0223735 A1 | 9/2007 | Lopresti et al. |
| 2007/0291971 A1 | 12/2007 | Halteren |
| 2008/0101589 A1 | 5/2008 | Horowitz et al. |
| 2009/0147981 A1 | 6/2009 | Blanchard et al. |
| 2009/0190781 A1 | 7/2009 | Fukuda |
| 2009/0285417 A1 | 11/2009 | Shin |
| 2010/0310106 A1 | 12/2010 | Blanchard et al. |
| 2011/0170730 A1 | 7/2011 | Zhu |
| 2012/0177206 A1 | 7/2012 | Yamagishi et al. |
| 2012/0263324 A1 | 10/2012 | Joyce et al. |
| 2013/0051585 A1 | 2/2013 | Karkkainen et al. |
| 2013/0108068 A1 | 5/2013 | Poulsen et al. |
| 2013/0163791 A1 | 6/2013 | Qi et al. |
| 2013/0169513 A1 | 7/2013 | Heinrich et al. |
| 2013/0329919 A1 | 12/2013 | He |
| 2015/0049893 A1 | 2/2015 | Heidenreich et al. |
| 2015/0381333 A1* | 12/2015 | Tennant .................. H04M 1/03 370/278 |
| 2016/0119721 A1 | 4/2016 | Doshida et al. |
| 2016/0127841 A1 | 5/2016 | Horii |
| 2016/0329041 A1 | 11/2016 | Qi et al. |
| 2017/0195795 A1 | 7/2017 | Mei et al. |
| 2017/0201823 A1 | 7/2017 | Shetye et al. |
| 2017/0208392 A1* | 7/2017 | Smithers .................. H04R 3/04 |
| 2017/0208395 A1 | 7/2017 | Wan et al. |
| 2017/0230741 A1 | 8/2017 | Matsuo et al. |
| 2017/0238096 A1 | 8/2017 | Nakagawa et al. |
| 2017/0353780 A1 | 12/2017 | Huang et al. |
| 2017/0353793 A1 | 12/2017 | Sun et al. |
| 2018/0048952 A1 | 2/2018 | Hong et al. |
| 2018/0091883 A1 | 3/2018 | Howes et al. |
| 2018/0167711 A1 | 6/2018 | Lin |
| 2018/0227660 A1 | 8/2018 | Azmi et al. |
| 2018/0271383 A1 | 9/2018 | Lee |
| 2018/0367885 A1 | 12/2018 | Gong et al. |
| 2018/0376231 A1 | 12/2018 | Pfaffinger |
| 2019/0026071 A1 | 1/2019 | Tamaoki et al. |
| 2019/0071011 A1 | 3/2019 | Konno et al. |
| 2019/0104352 A1 | 4/2019 | Ozawa et al. |
| 2019/0259367 A1* | 8/2019 | Chen ....................... G10L 21/02 |
| 2019/0261080 A1 | 8/2019 | Gerber et al. |
| 2020/0059544 A1* | 2/2020 | Hwang .................. H04R 17/00 |
| 2020/0137476 A1 | 4/2020 | Shinmen et al. |
| 2020/0169801 A1 | 5/2020 | Zhu |
| 2020/0252708 A1 | 8/2020 | Zhu |

FOREIGN PATENT DOCUMENTS

| | | |
|---|---|---|
| CN | 101022678 A | 8/2007 |
| CN | 101098353 A | 1/2008 |
| CN | 201426167 Y | 3/2010 |
| CN | 202435598 U | 9/2012 |
| CN | 103108268 A | 5/2013 |
| CN | 103179483 A | 6/2013 |
| CN | 103209377 A | 7/2013 |
| CN | 103260117 A | 8/2013 |
| CN | 103347235 A | 10/2013 |
| CN | 203233520 U | 10/2013 |
| CN | 203301726 U | 11/2013 |
| CN | 204377095 U | 6/2015 |
| CN | 104869515 A | 8/2015 |
| CN | 104883635 A | 9/2015 |
| CN | 204810512 U | 11/2015 |
| CN | 204948328 U | 1/2016 |
| CN | 204948329 U | 1/2016 |
| CN | 205336486 U | 6/2016 |
| CN | 205510154 U | 8/2016 |
| CN | 205754812 U | 11/2016 |
| CN | 106231462 A | 12/2016 |
| CN | 106303779 A | 1/2017 |
| CN | 106341752 A | 1/2017 |
| CN | 106792304 A | 5/2017 |
| CN | 206193360 U | 5/2017 |
| CN | 107231585 A | 10/2017 |
| CN | 206575566 U | 10/2017 |
| CN | 206640738 U | 11/2017 |
| CN | 206865707 U | 1/2018 |
| CN | 107820169 A | 3/2018 |
| CN | 207075075 U | 3/2018 |
| CN | 207340125 U | 5/2018 |
| CN | 108650597 A | 10/2018 |
| CN | 108712695 A | 10/2018 |
| CN | 207939700 U | 10/2018 |
| CN | 109032558 A | 12/2018 |
| CN | 109151680 A | 1/2019 |
| CN | 208572417 U | 3/2019 |
| CN | 208675298 U | 3/2019 |
| CN | 109640209 A | 4/2019 |

(56) References Cited

FOREIGN PATENT DOCUMENTS

| | | | |
|---|---|---|---|
| CN | 208783039 | U | 4/2019 |
| EP | 2765788 | A2 | 8/2014 |
| EP | 3404931 | A1 | 11/2018 |
| JP | H0993684 | A | 4/1997 |
| JP | 2004343286 | A | 12/2004 |
| KR | 20080103334 | A | 11/2008 |
| KR | 20090091378 | A | 8/2009 |
| WO | 0225990 | A1 | 3/2002 |
| WO | 2005053351 | A1 | 6/2005 |
| WO | 2010114195 | A1 | 10/2010 |
| WO | 2015087093 | A1 | 6/2015 |
| WO | 2016206764 | A1 | 12/2016 |
| WO | 2018107141 | A1 | 6/2018 |

OTHER PUBLICATIONS

International Search Report in PCT/CN2019/130884 dated Mar. 20, 2020, 6 pages.
International Search Report in PCT/CN2019/130886 dated Mar. 31, 2020, 6 pages.
International Search Report in PCT/CN2019/130944 dated Mar. 26, 2020, 6 pages.
International Search Report in PCT/CN2019/130921 dated Apr. 1, 2020, 6 pages.
International Search Report in PCT/CN2019/130942 dated Mar. 26, 2020, 6 pages.
International Search Report in PCT/CN2020/070540 dated Apr. 2, 2020, 6 pages.
International Search Report in PCT/CN2020/070550 dated Mar. 27, 2020, 6 pages.
International Search Report in PCT/CN2020/070545 dated Apr. 15, 2020, 6 pages.
International Search Report in PCT/CN2020/070551 dated Mar. 27, 2020, 7 pages.
International Search Report in PCT/CN2020/070542 dated Mar. 27, 2020, 6 pages.
International Search Report in PCT/CN2020/070539 dated Apr. 7, 2020, 6 pages.
International Search Report in PCT/CN2020/088190 dated Jul. 30, 2020, 6 pages.
International Search Report in PCT/CN2014/094065 dated Mar. 17, 2015, 5 pages.
Written Opinion in PCT/CN2014/094065 dated Mar. 17, 2015, 10 pages.
International Search Report in PCT/CN2020/087002 dated Jul. 14, 2020, 4 pages.
Written Opinion in PCT/CN2020/087002 dated Jul. 14, 2020, 5 pages.
International Search Report in PCT/CN2020/087526 dated Jul. 23, 2020, 5 pages.
Written Opinion in PCT/CN2020/087526 dated Jul. 23, 2020, 4 pages.
International Search Report in PCT/CN2020/083631 dated Jun. 29, 2020, 4 pages.
Written Opinion in PCT/CN2020/083631 dated Jun. 29, 2020, 4 pages.
International Search Report in PCT/CN2020/087034 dated Jul. 22, 2020, 4 pages.
Written Opinion in PCT/CN2020/087034 dated Jul. 22, 2020, 5 pages.
International Search Report in PCT/CN2020/084161 dated Jul. 6, 2020, 4 pages.
Written Opinion in PCT/CN2020/084161 dated Jul. 6, 2020, 4 pages.
International Search Report in PCT/CN2020/088482 dated Aug. 5, 2020, 4 pages.
Written Opinion in PCT/CN2020/088482 dated Aug. 5, 2020, 4 pages.
International Search Report in PCT/CN2020/116319 dated Dec. 11, 2020, 6 pages.
International Search Report in PCT/CN2020/106759 dated Oct. 28, 2020, 6 pages.
International Search Report in PCT/CN2012/086513 dated Mar. 14, 2013, 5 pages.
Written Opinion in PCT/CN2019/130884 dated Mar. 20, 2020, 6 pages.

* cited by examiner

ACOUSTIC OUTPUT APPARATUS

CROSS-REFERENCE TO RELATED APPLICATIONS

This Application is a continuation of International Application No. PCT/CN2019/130884, filed on Dec. 31, 2019, which claims priority of the Chinese Application No. 201910888067.6 filed on Sep. 19, 2019, priority of Chinese Application No. 201910888762.2 filed on Sep. 19, 2019, and priority of the Chinese Application No. 201910364346.2 filed on Apr. 30, 2019, the entire contents of each of which are hereby incorporated reference.

TECHNICAL FIELD

The present disclosure relates to the field of acoustics, particularly, relates to an acoustic output apparatus.

BACKGROUND

An open binaural acoustic output apparatus is a portable audio output device apparatus that facilitates sound conduction within a specific range of a user. Compared with traditional in-ear and over-ear headphones, the open binaural acoustic output apparatus may have the characteristics of not blocking and covering the ear canal, allowing users to obtain sound information in an ambient environment while listening to music, improving safety and comfort. Due to the use of the open structure, a sound leakage of the open binaural acoustic output apparatus may be more serious than that of traditional headphones. At present, it is common practice in the industry to use two or a plurality of sound sources to construct a specific sound field and adjust a sound pressure distribution to reduce sound leakage. Although this method can achieve the effect of reducing leaked sound to a certain extent, it still has certain limitations. For example, while suppressing sound leakage, this method will also reduce the volume of the sound sent to the user. Moreover, since the wavelength of different frequency sounds is different, the method has a weak suppression effect on high-frequency leakage.

Therefore, it is desirable to provide an acoustic output apparatus for increasing the user's listening volume and reducing leakage.

SUMMARY

One of the embodiments of the present disclosure provides an acoustic output apparatus. The acoustic output apparatus comprises at least one low-frequency acoustic driver that outputs sounds from at least two first sound guiding holes; at least one high-frequency acoustic driver that outputs sounds from at least two second sound guiding holes; and a support component configured to support the at least one high-frequency acoustic driver and the at least one low-frequency acoustic driver, and cause the at least two first sound guiding holes and the at least two second sound guiding holes to locate away from a position of an ear of a user.

In some embodiments, the sounds output from the low-frequency acoustic driver are in a first frequency range, the sounds output from the high-frequency acoustic driver are in a second frequency range, the second frequency range may include frequencies higher than the first frequency range.

In some embodiments, the first frequency range includes frequencies less than 650 Hz, and the second frequency range includes frequencies exceeds 1000 Hz.

In some embodiments, the first frequency range and the second frequency range overlap.

In some embodiments, the at least two first sound guiding holes and the at least two second sound guiding holes are located on the support component.

In some embodiments, an amplitude ratio of the sounds output from the at least two first sound guiding holes may be a first amplitude ratio, and an amplitude ratio of the sounds output from the at least two second sound guiding holes may be a second amplitude ratio. The first amplitude ratio may be greater than the second amplitude ratio.

In some embodiments, the first amplitude ratio and the second amplitude ratio are within a range of 1-1.5.

In some embodiments, a first acoustic route from the at least one low-frequency acoustic driver to the at least two first sound guiding holes includes an acoustic resistance material. The acoustic resistance material has an acoustic impedance and affects the first amplitude ratio. In some embodiments, a second acoustic route from the at least one high-frequency acoustic driver to the at least two second sound guiding holes includes an acoustic resistance material. The acoustic resistance material has an acoustic impedance and affects the second amplitude ratio.

In some embodiments, the at least one low-frequency acoustic driver may be located in a first housing that defines a first front chamber and a first rear chamber of the at least one low-frequency acoustic driver. The first front chamber of the at least one low-frequency acoustic driver may be acoustically coupled to one of the at least two first sound guiding holes. The first rear chamber of the at least one low-frequency acoustic driver may be acoustically coupled to the other one of the at least two first sound guiding holes.

In some embodiments, the at least one high-frequency acoustic driver may be located in a second housing that defines a second front chamber and a second rear chamber of the at least one high-frequency acoustic driver. The second front chamber of the at least one high-frequency acoustic driver may be acoustically coupled to one of the at least two second sound guiding holes. The second rear chamber of the at least one high-frequency acoustic driver may be acoustically coupled to the other one of the at least two second sound guiding holes.

In some embodiments, the first front chamber and the first rear chamber of the at least one low-frequency acoustic driver have different acoustic impedances, and the second front chamber and the second rear chamber of the at least one high-frequency acoustic driver have different acoustic impedances.

In some embodiments, an acoustic impedance ratio of the first front chamber and the first rear chamber of the at least one low-frequency acoustic driver may exceed an acoustic impedance ratio of the second front chamber and the second rear chamber of the at least one high-frequency acoustic driver.

In some embodiments, the acoustic impedance ratio of the first front chamber and the first rear chamber of the at least one low-frequency acoustic driver may be in a range of 0.8-1.2.

In some embodiments, the first acoustic route may include at least one of a sound guiding tube, a sound cavity, a resonant cavity, a sound hole, a sound slit, or a tuning network.

In some embodiments, a diameter of the sound guiding tube corresponding to the first acoustic route may be not less than 1.5 mm.

In some embodiments, a diameter of the sound guiding tube corresponding to the first acoustic route may be not greater than 10 mm.

In some embodiments, a length of the sound guiding tube in the acoustic output apparatus may be not greater than 100 mm.

In some embodiments, a phase difference of the sounds output from the at least two first sound guiding holes may be a first phase difference, a phase difference of the sounds output from the at least two second sound guiding holes may be a second phase difference. An absolute value of the first phase difference may be less than an absolute value of the second phase difference.

In some embodiments, the absolute value of the first phase difference is within a range of 160-180 degrees, and the absolute value of the second phase difference is within a range of 170-180 degrees.

In some embodiments, the at least one low-frequency acoustic driver outputs the sounds from the at least two first sound guiding holes based on different sound paths, and the at least one high-frequency acoustic driver outputs the sounds from the at least two second sound guiding holes based on different sound paths.

In some embodiments, a ratio of the sound paths of the at least one low-frequency acoustic driver acoustically coupled to the at least two first sound guiding holes is in the range of 0.5-2.

In some embodiments, the at least two first sound guiding holes have different sizes or shapes.

In some embodiments, the at least two second sound guiding holes have different sizes or shapes.

BRIEF DESCRIPTION OF THE DRAWINGS

The present disclosure is further illustrated in terms of exemplary embodiments. These exemplary embodiments are described in detail with reference to the drawings. These examples are not restrictive. In these examples, the same number indicates the same structure, wherein.

DETAILED DESCRIPTION

Figure 1:
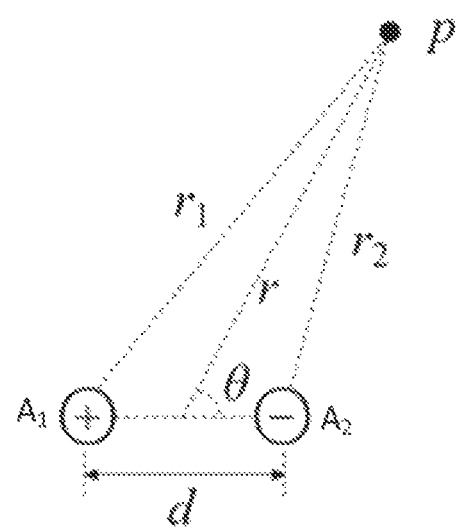
FIG. 1 is a schematic diagram illustrating an exemplary dual-point sound source according to some embodiments of the present disclosure.

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It will be understood that the term "system," "device," "unit," and/or "module" used herein are one method to distinguish different components, elements, parts, sections, or assembly of different levels in ascending order. However, if other words may achieve the same purpose, the words may be replaced by other expressions.

As used in the disclosure and the appended claims, the singular forms "a," "an," and "the" include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments of the present disclosure. It should be noted that the foregoing or the following operations may not be performed in the order accurately. Instead, the steps may be processed in reverse order or simultaneously. Moreover, other operations may also be added into these procedures, or one or more steps may be removed from these procedures.

The present disclosure provides an acoustic output apparatus. When the user wears the acoustic output apparatus, the acoustic output apparatus may be located at least on one side of the user's head, close but not blocking the user's ear. The acoustic output apparatus may be worn on the head of the user (for example, a non-in-ear open headset worn with glasses, a headband, or other structural means), or worn on other body parts of the user (such as the neck/shoulder region of the user), or placed near the ears of user by other means (such as the way the user holds it). The acoustic output apparatus may include at least two groups of acoustic drivers, including at least one group of high-frequency acoustic drivers and one group of low-frequency acoustic drivers. Each group of acoustic drivers may be used to generate a sound with a certain frequency range, and the sound may be transmitted outward through at least two sound guiding holes acoustically coupled with it.

FIG. 1 is a schematic diagram illustrating an exemplary dual-point sound source according to some embodiments of the present disclosure. In order to further explain the effect of the setting of the sound guiding holes on the acoustic output apparatus on the acoustic output effect of the acoustic output apparatus, and considering that the sound may be regarded as propagating outwards from the sound guiding holes, the present disclosure may describe the sound guiding holes on the acoustic output apparatus as sound sources for externally outputting sound.

Just for the convenience of description and for the purpose of illustration, when the sizes of the sound guiding holes on the acoustic output apparatus are small, each sound guiding hole may be approximately regarded as a point sound source. In some embodiments, any sound guiding hole provided on the acoustic output apparatus for outputting sound may be approximated as a single point sound source on the acoustic output apparatus. The sound field pressure p generated by a single point sound source may satisfy Equation (1):

$$p = \frac{j\omega\rho_0}{4\pi r} Q_0 \exp j(\omega t - kr), \qquad (1)$$

where $\omega$ denotes an angular frequency, $\rho_0$ denotes an air density, r denotes a distance between the target point and the sound source, $Q_0$ denotes a volume velocity of the sound source, and k denotes a wave number. It may be concluded that the magnitude of the sound field pressure of the sound field of the point sound source is inversely proportional to the distance to the point sound source.

It should be noted that the sound guiding hole for outputting sound as a point sound source may only serve as an explanation of the principle and effect of the present disclosure, and may not limit the shape and size of the sound guiding hole in practical applications. In some embodiments, if an area of the sound guiding hole is large, the sound guiding hole may also be equivalent to a planar acoustic source. In some embodiments, the point sound source may also be realized by other structures, such as a vibration surface and a sound radiation surface. For those skilled in the art, without creative activities, it may be known that sounds generated by structures such as sound guiding holes, vibration surfaces, and acoustic radiation surfaces may be equivalent to point sound sources at the spatial scale discussed in the present disclosure, and may have consistent sound propagation characteristics and the same mathematical description method. Further, for those skilled in the art, without creative activities, it may be known that the acoustic effect achieved by "acoustic driver outputs sound from at least two first sound guiding holes" described in the present disclosure may also achieve the same effect by other acoustic structures, for example, "at least two acoustic drivers each of which outputs sound from at least one acoustic radiation surface". According to actual situations, other acoustic structures may be selected for adjustment and combination, and the same acoustic output effect may also be achieved. The principle of radiating sound outward with structures such as surface sound sources may be similar to that of point sound sources, and may not be repeated here.

As mentioned above, at least two sound guiding holes corresponding to the same acoustic driver may be set on the acoustic output apparatus provided in the specification. In this case, two point sound sources (also referred to as a dual-point sound source) may be formed, which may reduce sound transmitted to the surrounding environment. For convenience, the sound output from the acoustic output apparatus to the surrounding environment may be referred to as far-field leakage since it may be heard by others in the environment. The sound output from the acoustic output apparatus to the ears of the user wearing the acoustic output apparatus may also be referred to as near-field sound since a distance between the acoustic output apparatus and the user may be relatively short. In some embodiments, the sounds output from two sound guiding holes (i.e., the dual-point sound source) have a certain phase difference. It should be noted that a phase difference between two sounds output from two sound guiding holes in the present disclosure may also be referred to as a phase difference between the two sound guiding holes, or a phase difference between two point sound sources corresponding to the two sound guiding holes, or a phase difference of a dual-point sound source. When the position, the amplitude, and phase difference of the two point sound sources meet certain conditions, the acoustic output apparatus may output different sound effects in the near-field (for example, the position of the user's ear) and the far-field. For example, if the phases of the point sound sources corresponding to the two sound guiding holes are opposite, that is, an absolute value of the phase difference between the two point sound sources may be 180 degrees, the far-field leakage may be reduced according to the principle of reversed phase cancellation.

As shown in FIG. 1, a sound pressure p in the sound field generated by a dual-point sound source may satisfy the following Equation (2):

$$p = \frac{A_1}{r_1} \exp j(\omega t - kr_1 + \varphi_1) + \frac{A_2}{r_2} (\omega t - kr_2 + \varphi_2), \qquad (2)$$

where, $A_1$ and $A_2$ denote intensities of two point sound sources, $\varphi_1$ and $\varphi_2$ denote phases of the two point sound sources, respectively, d denotes a distance between the two point sound sources, and $r_1$ and $r_2$ may satisfy Equation (3):

$$\begin{cases} r_1 = \sqrt{r^2 + \left(\frac{d}{2}\right)^2 - 2 \times r \times \frac{d}{2} \times \cos\theta} \\ r_2 = \sqrt{r^2 + \left(\frac{d}{2}\right)^2 + 2 \times r \times \frac{d}{2} \times \cos\theta} \end{cases}, \qquad (3)$$

where, r denotes a distance between any target point and the center of the dual-point sound source in the space, and θ denotes an angle between a line connecting the target point and the center of the dual-point sound source and another line on which the dual-point sound source may be located.

According to Equation (3), the sound pressure p of the target point in the sound field may relate to the intensity of each point sound source, the distance d, the phases of the two point sound sources, and the distances to the two point sound sources.

A dual-point sound source with different output effects may be formed through different settings of sound guiding holes. In this case, the volume of near-field sound may be improved, and the leakage of the far-field may be reduced. For example, an acoustic driver may include a vibration diaphragm. When the vibration diaphragm vibrates, sounds may be transmitted from the front and rear sides of the vibration diaphragm, respectively. The front side of the vibration diaphragm in the acoustic output apparatus may be provided with a front chamber for transmitting sound. The front chamber may be coupled with a sound guiding hole acoustically. The sound transmitted from the front side of the vibration diaphragm may be transmitted to the sound guiding hole through the front chamber and further transmitted outwards. The rear side of the vibration diaphragm in the acoustic output apparatus may be provided with a rear chamber for transmitting sound. The rear chamber may be coupled with another sound guiding hole acoustically, and the sound transmitted from the rear side of the vibration diaphragm may be transmitted to the sound guiding hole through the rear chamber and propagate further outwards. It should be noted that, when the vibration diaphragm vibrating, the front side and the rear side of the vibration diaphragm may generate sound with opposite phases, respectively. In some embodiments, the structures of the front chamber and rear chamber may be specially set so that the sound output by the acoustic driver at different sound guiding holes may meet specific conditions. For example, lengths of the front chamber and the rear chamber may be specially designed such that sound with a specific phase relationship (e.g., opposite phases) may be output at the two sound guiding holes. As a result, problems that the acoustic output apparatus has a low volume in the near-field and the sound leaks in the far-field may be effectively resolved.

Figure 2:
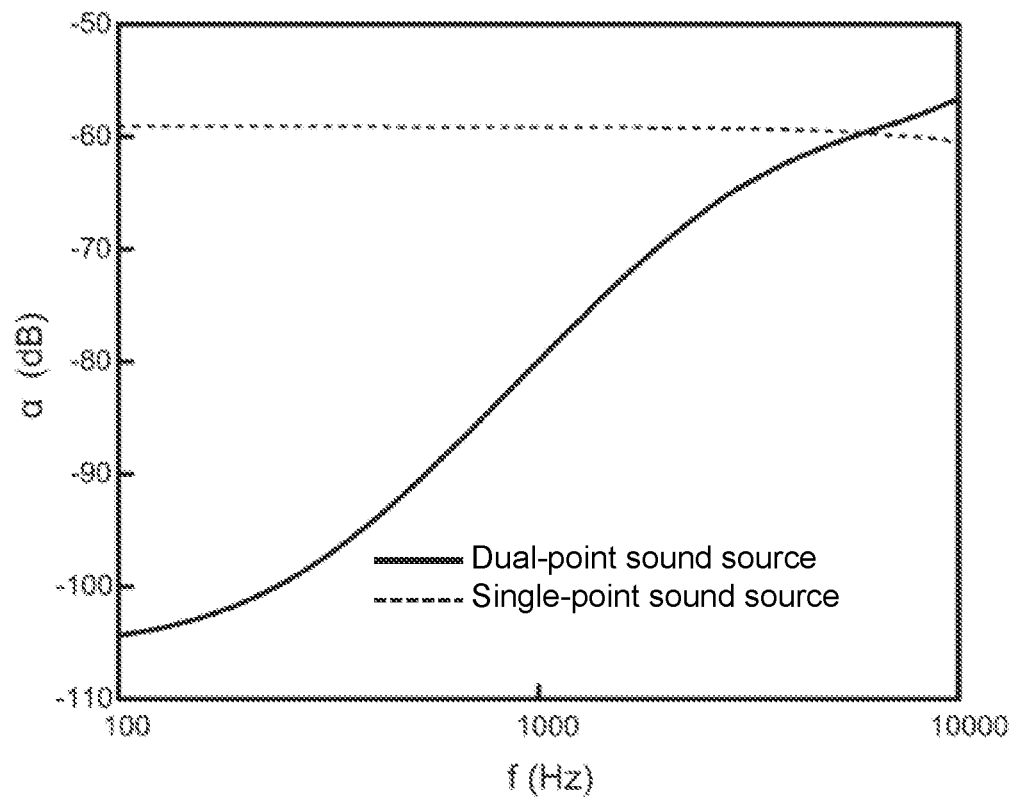
FIG. 2 is a schematic diagram illustrating variations of hearing sounds and leaked sounds of a dual-point sound source with a certain distance and a single point sound source with frequency according to some embodiments of the present disclosure.

FIG. 2 is a schematic diagram illustrating variations of hearing sounds and leaked sounds of a dual-point sound source with a certain distance and a single point sound source with frequency according to some embodiments of the present disclosure.

Under certain conditions, compared to a single point sound source, the volume of the far-field leakage of the dual-point sound source may increase with the frequency. In other words, the leakage reduction capability of the dual-point sound source in the far-field may decrease with the frequency increases. For further description, a curve of far-field leakage with frequency may be described in connection with FIG. 2.

A distance between the two point sound sources in FIG. 2 may be fixed, and the two point sound sources may have a same amplitude and opposite phases. The dotted line may indicate a variation curve of a volume of the single point sound source at different frequencies. The solid line may indicate a variation curve of a volume of the leaked sound of the dual-point sound source at different frequencies. The abscissa of the diagram may represent the frequency (f) of the sound, and the unit may be Hertz (Hz). The ordinate of the diagram may use a normalization parameter α to evaluate the volume of the leaked sound. The calculation equation of parameter α may be as follows:

$$\alpha = \frac{|P_{far}|^2}{|P_{ear}|^2}, \tag{4}$$

where $P_{far}$ denotes the sound pressure of the acoustic output apparatus in the far-field (i.e., the sound pressure of the far-field sound leakage). $P_{ear}$ denotes the sound pressure around the user's ears (i.e., the sound pressure of the near-field sound). The larger the value of α, the larger the far-field leakage relative to the near-field sound heard may be, indicating that the capability of the acoustic output apparatus for reducing the far-field leakage may be worse.

As shown in FIG. 2, when the frequency is below 6000 Hz, the far-field leakage produced by the dual-point sound source may be less than the far-field leakage produced by the single point sound source and may increase as the frequency increases. When the frequency is close to 10000 Hz (for example, about 8000 Hz or above), the far-field leakage produced by the dual-point sound source may be greater than the far-field leakage produced by the single point sound source. In some embodiments, a frequency corresponding to an intersection of the variation curves of the dual-point sound source and the single point sound source may be determined as an upper limit frequency that the dual-point sound source can reduce the leakage.

In connection with FIG. 2, a frequency division point of the frequency may be determined through the variation tendency of the capability of the dual-point sound source in reducing the sound leakage. Parameters of the dual-point sound source may be adjusted according to the frequency division point so as to reduce the sound leakage of the acoustic output apparatus. For example, the frequency corresponding to α of a specific value (e.g., −60 dB, −70 dB, −80 dB, −90 dB, etc.) may be used as the frequency division point. Parameters of the dual-point sound source may be determined by setting the frequency band below the frequency division point to improve the near-field sound, and setting the frequency band above the frequency division point to reduce far-field sound leakage. For the purpose of illustration, the frequency 1000 Hz corresponding to α of a value of −80 dB may be used as the frequency division point. When the frequency is relatively small (for example, in a range of 100 Hz to 1000 Hz), the capability of reducing sound leakage of the dual-point sound source may be relatively strong (i.e., the value of α may be small which is below −80 dB). In such a frequency band, an increase of the volume of the heard sound may be determined as an optimization goal. When the frequency is relatively great, (for example, in a range of 1000 Hz to 8000 Hz), the capability of reducing sound leakage of the dual-point sound source may be relatively weak (i.e., the value of α may be large which is above −80 dB). In such a frequency band, a decrease of the sound leakage may be determined as the optimization goal.

In some embodiments, a high-frequency band with relatively high sound frequencies (e.g., a sound output by a high-frequency acoustic driver) and a low-frequency band with relatively low sound frequencies (e.g., a sound output by a low-frequency acoustic driver) may be determined based on the frequency division point. As used herein, a low-frequency band in the embodiments of the present disclosure refers to a first frequency range with relatively low frequencies, and a high-frequency band refers to a second frequency range with relatively high frequencies. The first frequency range and the second frequency range may include or not include overlapping frequency ranges. The second frequency range may include frequencies higher than the first frequency range. Merely by way of example, the first frequency range may include frequencies lower than a first frequency threshold, and the second frequency range may include frequencies higher than a second frequency threshold. The first frequency threshold may be lower than, equal to, or higher than the second frequency threshold. For example, the first frequency threshold may be less than the second frequency threshold (for example, the first frequency threshold may be 600 Hz and the second frequency range may be 700 Hz), which indicates that there is no overlap between the first frequency range and the second frequency range. As another example, the first frequency threshold may be equal to the second frequency threshold (for example, both the first frequency threshold and the second frequency threshold may be 650 Hz or other arbitrary frequency values). As a further example, the first frequency threshold may be greater than the second frequency threshold, which indicates that there is an overlap between the first frequency range and the second frequency range. In such cases, a difference between the first frequency threshold and the second frequency threshold may not exceed a third frequency threshold. The third frequency threshold may be a constant value (for example, 20 Hz, 50 Hz, 100 Hz, 150 Hz, 200 Hz), or may be a value related to the first frequency threshold and/or the second frequency threshold (for example, 5%, 10%, 15%, etc. of the first frequency threshold), or a value flexibly set by the user according to the actual scene, which is not limited here. It should be noted that the first frequency threshold and the second frequency threshold may be flexibly set according to different situations, which are not limited here.

As described above, the frequency division point may be a signal frequency that distinguishes the first frequency range from the second frequency range. For example, when there is an overlapping frequency range between the first frequency range and the second frequency range, the frequency division point may be a feature point in the overlapping frequency range (for example, a low-frequency boundary point, a high-frequency boundary point, or a center frequency point, etc., of the overlapping frequency range). In some embodiments, the frequency division point may be determined according to a relationship between the frequency and the sound leakage of the acoustic output apparatus. For example, considering that the leaked sound of the acoustic output apparatus changes with the frequency, a frequency point corresponding to a volume of the leaked sound that meets a certain condition may be designated as the frequency division point, such as 1000 Hz in FIG. 2. In some alternative embodiments, the user may directly designate a specific frequency as the frequency division point. For example, considering that a human ear may hear the sound frequency range of 20 Hz-20 kHz, the user may select a frequency point in the range as the frequency division point. For example, the frequency division point may be 600 Hz, 800 Hz, 1000 Hz, 1200 Hz, etc. In some embodiments, the frequency division point may be determined according to the performance of the acoustic driver. For example, considering that a low-frequency acoustic driver and a high-frequency acoustic driver have different frequency response curves, the frequency division point may be determined from a frequency range that is higher than ½ of the upper limit frequency of the low-frequency acoustic driver and lower than 2 times the lower limit frequency of the high-frequency acoustic driver.

In some embodiments, the method for measuring and calculating the sound leakage may be adjusted according to the actual conditions. For example, an average value of amplitudes of the sound pressure of a plurality of points on a spherical surface centered by the dual-point sound source with a radius of 40 cm may be determined as the value of the sound leakage. As another example, one or more points of the far-field position may be taken as the position for measuring the sound leakage, and the sound volume of the position may be taken as the value of the sound leakage. As another example, a center of the dual-point sound source may be used as a center of a circle, and sound pressure amplitudes of two or more points evenly sampled according to a certain spatial angle in the far-field may be averaged, the average value may be taken as the value of the sound leakage. These measurement and calculation methods may be adjusted by those skilled in the art according to actual conditions and may be not intended to be limiting.

According to FIG. 2, it may be concluded that in the high-frequency band (higher frequency band determined according to the frequency division point), the dual-point sound source may have a weak capability to reduce sound leakage, and in the low-frequency band (lower frequency band determined according to the frequency division point), the dual-point sound source may have a strong capability to reduce sound leakage. At a certain sound frequency, the amplitudes, phase differences, etc., of the two point sound sources may be different, and the capability of the two point sound sources to reduce sound leakage may be different, and the difference between the volume of the heard sound and volume of the leaked sound may also be different. For a better description, the curve of the far-field leakage as a function of the distance between the two point sound sources may be described with reference to FIGS. 3A and 3B.

Figure 3A:
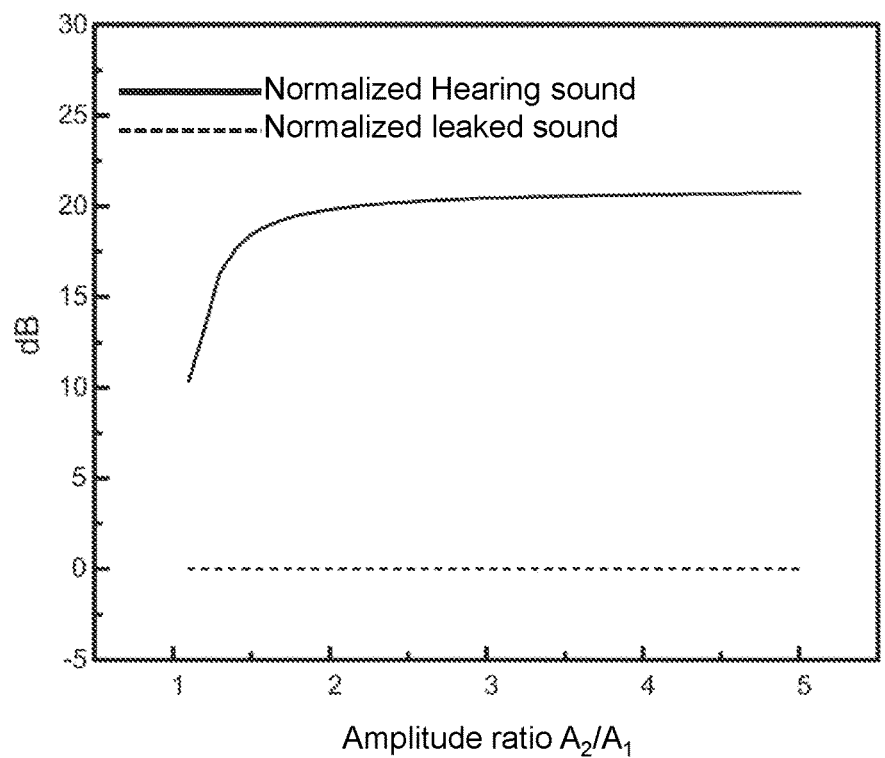
FIG. 3A is a graph illustrating variations of a hearing sound and a leaked sound of a dual-point sound source with an amplitude ratio of the two point sound sources according to some embodiments of the present disclosure.

In some embodiments, a hearing sound and a leaked sound produced by a dual-point sound source may be related to amplitudes of two point sound sources of the dual-point sound source. FIG. 3A is a graph illustrating variations of a hearing sound and a leaked sound of a dual-point sound source with an amplitude ratio of the two point sound sources according to some embodiments of the present disclosure. As used herein, the amplitude ratio refers to a ratio of a greater amplitude to a less amplitude of the sounds output from the two point sound sources. It should be noted that an amplitude ratio of two sounds output from two sound guiding holes in the present disclosure may also be referred to as an amplitude ratio of the two sound guiding holes, or an amplitude ratio of two point sources corresponding to the two sound guiding holes, or an amplitude ratio of a dual-point sound source. As shown in FIG. 3A, the solid line represents a variation curve of the near-field hearing sound of the dual-point sound source with amplitude, and the dotted line represents a variation curve of the far-field leaked sound of the dual-point sound source with the amplitude. The abscissa represents the amplitude ratio between the two point sound sources, and the ordinate represents the sound volume. In order to better reflect the relative variations of the hearing sound and the leaked sound, the hearing sound volume may be normalized based on the leaked sound volume, that is, the ordinate reflects the ratio of the actual sound volume to the leakage sound volume (i.e., $|P|/|P_{far}|$).

According to FIG. 3A, the hearing sound and the leaked sound of the dual-point sound source may be at a specific frequency. At the specific frequency, when the amplitude ratio between the two point sound sources increases within a certain range, the increase of the hearing sound volume of the dual-point sound source may be significantly greater than the increase of the leaked sound volume. As shown in FIG. 3A, when the amplitude ratio $A_2/A_1$ between the two point sound sources changes within a range of 1-1.5, the increase of the hearing sound volume may be obviously greater than the increase of the leaked sound volume. That is, in such cases, the greater the amplitude ratio between the two point sound sources, the more better for the dual-point sound source to produce a higher near-field hearing sound volume and reduce the far-field leaked sound volume. In some embodiments, as the amplitude ratio between the two point sound sources further increases, the slope of the normalized curve of the hearing sound volume gradually tends to 0, and the normalized curve of the hearing sound volume gradually tends to be parallel with the normalized curve of the leaked sound volume, which indicates that the increase of the hearing sound volume is substantially the same as the increase of the leaked sound volume. As shown in FIG. 3A, when the amplitude ratio $A_2/A_1$ between the two point sound sources changes within a range greater than 2, the increase of the hearing sound volume may be substantially the same as the increase of the leaked sound volume.

In some embodiments, in order to ensure that the dual-point sound source may produce a larger near-field hearing sound volume and a smaller far-field leaked sound volume, the amplitude ratio between the two point sound sources may be set in the range of 1-5. In some embodiments, the amplitude ratio between the two point sound sources may be set in the range of 1-4.5. In some embodiments, the amplitude ratio between the two point sound sources may be set in the range of 1-4. In some embodiments, the amplitude ratio between the two point sound sources may be set in the range of 1-3.5. In some embodiments, the amplitude ratio between the two point sound sources may be set in the range of 1-3. In some embodiments, the amplitude ratio between the two point sound sources may be set in the range of 1-2. In some embodiments, the amplitude ratio between the two point sound sources may be set in the range of 1-1.5.

Figure 3B:
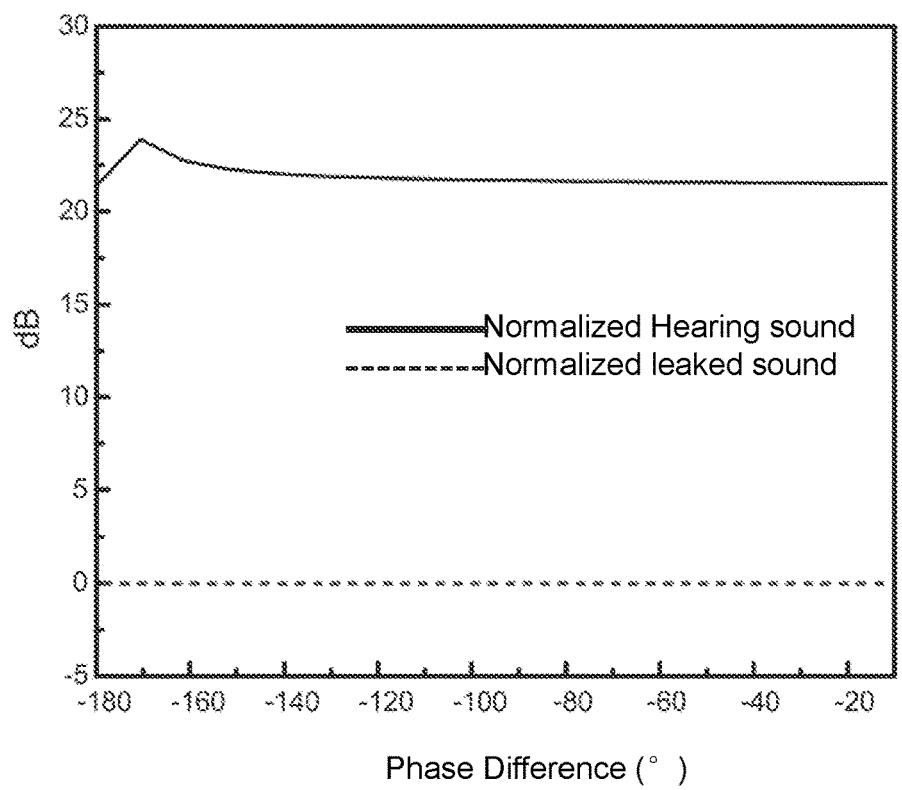
FIG. 3B is a graph illustrating variations of a hearing sound and a leaked sound of a dual-point sound source with a phase difference between two point sound sources of the dual-point sound source according to some embodiments of the present disclosure.

In some embodiments, a hearing sound and a leaked sound produced by a dual-point sound source may be related to phases of the two point sound sources. FIG. 3B is a graph illustrating variations of a hearing sound and a leaked sound of a dual-point sound source with a phase difference between two point sound sources of the dual-point sound source according to some embodiments of the present disclosure. Similar to FIG. 3A, as shown in FIG. 3B, the solid line represents a variation curve of the near-field hearing sound of the dual-point sound source with the phase difference, and the dotted line represents a variation curve of the far-field leaked sound of the dual-point sound source with the phase difference. The abscissa represents the phase difference between the two point sound sources, and the ordinate represents the sound volume. In order to better reflect the relative variations of the hearing sound and the leaked sound, the hearing sound volume may be normalized based on the leaked sound volume, that is, the ordinate reflects the ratio of the actual sound volume to the leaked sound volume (i.e., $|P|/|P_{far}|$).

According to FIG. 3B, the hearing sound and the leaked sound of the dual-point sound source may be at a specific frequency. At the specific frequency, as the phase difference between the two point sound sources changes, the normalized curve corresponding to the hearing sound volume of the dual-point sound source may form a peak. As shown in FIG. 3B, an absolute value of the phase difference between the two point sound sources corresponding to the peak may be about 170 degrees. At the peak, the dual-point sound source has a largest normalized hearing sound volume, which indicates that the dual-point sound source may produce a greater hearing sound volume while keeping the leaked sound volume unchanged, or the dual-point sound source may produce a smaller leaked sound volume while maintaining the hearing sound volume.

It should be noted that at different frequencies, the phase difference corresponding to the peak of the normalized curve of the hearing sound volume may be shifted or change. In some embodiments, in order to ensure that within a certain sound frequency range (for example, within the audible frequency range of the human ear), the dual-point sound source may produce a larger near-field hearing sound volume and a smaller far-field leaked sound volume, the absolute value of the phase difference between the two point sound sources may be set to in a certain range. In some embodiments, the absolute value of the phase difference between the two point sound sources may be set in the range from 180 degrees to 120 degrees. In some embodiments, the absolute value of the phase difference between the two point sound sources may be set in the range from 180 degrees to 140 degrees. In some embodiments, the absolute value of the phase difference between the two point sound sources may be set in the range from 180 degrees to 150 degrees. In some embodiments, the absolute value of the phase difference between the two point sound sources may be set in the range from 180 degrees to160 degrees.

According to the above descriptions, it may be seen that by adjusting the parameters of the dual-point sound source by certain means, the increase of the near-field hearing sound volume may be greater than the increase of the far-field leaked sound volume. In practical applications, the amplitudes and/or phase difference of the dual-point sound source may be limited or adjusted to better improve the sound output effect of the dual-point sound source based on sound characteristics of the dual-point sound source at different frequencies. For example, a high-frequency dual-point sound source and a low-frequency dual-point sound source may be set. By adjusting an amplitude ratio of two sound sources of each dual-point sound source by certain means, the amplitude ratio between the two sound sources of the high-frequency dual-point sound source may be different from the amplitude ratio between the two sound sources of the low-frequency dual-point sound source. Specifically, considering that the low-frequency dual-point sound source has less sound leakage (i.e., with stronger leakage reduction ability), and the high-frequency dual-point sound source has greater sound leakage (i.e., with weak leakage reduction ability), the amplitude ratio between the two sound sources of the low-frequency dual-point sound source may be set to be greater than the amplitude ratio between the two sound sources of the high-frequency dual-point sound source to increase the hearing sound volume of the low-frequency dual-point sound source. As another example, a high-frequency dual-point sound source and a low-frequency dual-point sound source may be set. By adjusting a phase difference of the two sound sources of each dual-point sound source by certain means, an absolute value of the phase difference between the two sound sources of the high-frequency dual-point sound source may be different from an absolute value of the phase difference between the two sound sources of the low-frequency dual-point sound source. Specifically, considering that the normalized hearing sound curves corresponding to the low-frequency dual-point sound source and the high-frequency dual-point sound source are different, the absolute value of the phase difference between the two sound sources of the high-frequency dual-point sound source may be greater or less than the absolute value of the phase difference between the two sound sources of the low-frequency dual-point sound source.

Figure 4:
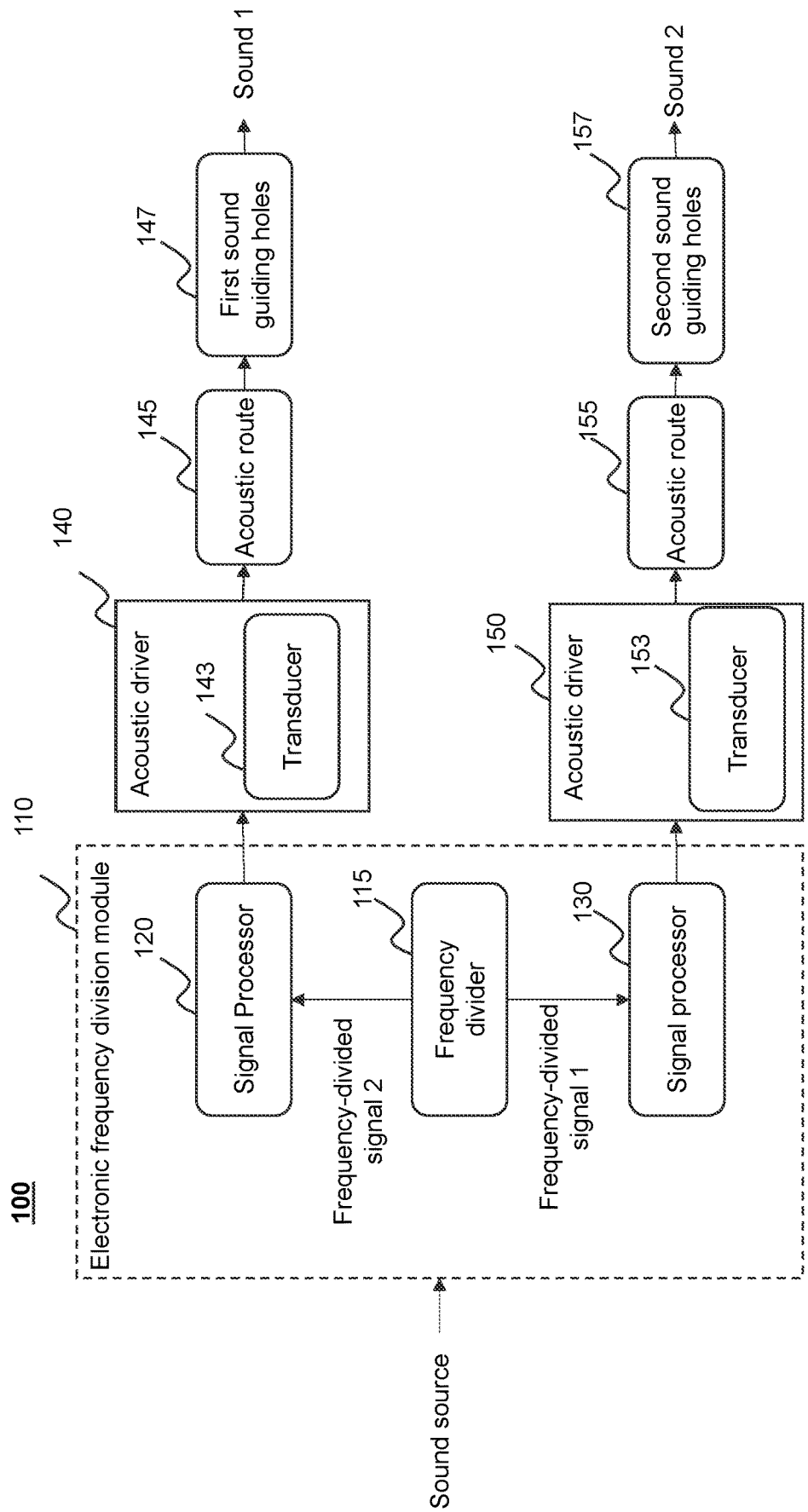
FIG. 4 is a schematic diagram illustrating an exemplary acoustic output apparatus according to some embodiments of the present disclosure.

FIG. 4 is a schematic diagram illustrating an exemplary acoustic output apparatus according to some embodiments of the present disclosure.

As shown in FIG. 4, the acoustic output apparatus 100 may include an electronic frequency division module 110, an acoustic driver 140, an acoustic driver 150, an acoustic route 145, an acoustic route 155, at least two first sound guiding holes 147, and at least two second sound guiding holes 157. In some embodiments, the acoustic output apparatus 100 may further include a controller (not shown in the figure). The electronic frequency division module 110, as part of the controller, may be configured to generate electrical signals that are input into different acoustic drivers. The connection between different components in the acoustic output apparatus 100 may be wired or wireless. For example, the electronic frequency division module 110 may send signals to the acoustic driver 140 and/or the acoustic driver 150 through a wired transmission or a wireless transmission.

The electronic frequency division module 110 may divide the frequency of a source signal. The source signal may come from one or more sound source apparatuses (for example, a memory storing audio data) integrated into the acoustic output apparatus 100. The source signal may also be an audio signal that the acoustic output apparatus 100 received by a wired or wireless means. In some embodiments, the electronic frequency division module 110 may decompose the input source signal into two or more frequency-divided signals containing different frequencies. For example, the electronic frequency division module 110 may decompose the source signal into a first frequency-divided signal (or frequency-divided signal 1) with high-frequency sound and a second frequency-divided signal (or frequency-divided signal 2) with low-frequency sound. For convenience, a frequency-divided signal with high-frequency sound may be referred to as a high-frequency signal, and a frequency-divided signal with low-frequency sound may be directly referred to as a low-frequency signal. The low-frequency signal may refer to a sound signal with frequencies in a first frequency range. The high-frequency signal may refer to a sound signal with frequencies in a second frequency range.

In some embodiments, the electronic frequency division module 110 may include a frequency divider 115, a signal processor 120, and a signal processor 130. The frequency divider 115 may be used to decompose the source signal into two or more frequency-divided signals containing different frequency components, for example, a frequency-divided signal 1 with high-frequency sound components and a frequency-divided signal 2 with low-frequency sound components. In some embodiments, the frequency divider 115 may be an electronic device that may implement the signal decomposition function, including but not limited to one of a passive filter, an active filter, an analog filter, a digital filter, or any combination thereof.

The signal processors 120 and 130 may respectively further process the frequency-divided signals to meet the requirements of subsequent sound output. In some embodiments, the signal processor 120 or 130 may include one or more signal processing components. For example, the signal processor may include, but not be limited to, an amplifier, an amplitude modulator, a phase modulator, a delayer, or a dynamic gain controller, or the like, or any combination thereof. Merely by way of example, the processing of the sound signal by the signal processor 120 and/or the signal processor 130 may include adjusting the amplitude corresponding to some frequencies in the sound signal. Specifically, in a case where the first frequency range and the second frequency range overlap, the signal processors 120 and 130 may adjust the intensity of the sound signal corresponding to the frequency in the overlapping frequency range (for example, reduce the amplitude of the signal corresponding to the frequency in the overlapping frequency range). This is to avoid excessive volume in the overlapping frequency range in the subsequent output sound caused by the superposition of multiple sound signals. In some embodiments, the processing of the sound signal by the signal processor 120 and/or the signal processor 130 may include adjusting the phase corresponding to some frequencies in the sound signal.

After the processing operations are performed by the signal processor 120 or 130, the frequency-divided signals may be transmitted to the acoustic drivers 140 and 150, respectively. In some embodiments, the sound signal transmitted into the acoustic driver 140 may be a sound signal including a lower frequency range (e.g., the first frequency range). Therefore, the acoustic driver 140 may also be referred to as a low-frequency acoustic driver. The sound signal transmitted into the acoustic driver 150 may be a sound signal including a higher frequency range (e.g., the second frequency range). Therefore, the acoustic driver 150 may also be referred to as a high-frequency acoustic driver. The acoustic driver 140 and the acoustic driver 150 may convert sound signals into a low-frequency sound and a high-frequency sound, respectively, then propagate the converted signals outwards.

In some embodiments, the acoustic driver 140 may be acoustically coupled to at least two first sound guiding holes (such as two first sound guiding holes 147) (for example, connected to the two first sound guiding holes 147 via two acoustic routes 145 respectively). Then the acoustic driver 140 may propagate sound through the at least two first sound guiding holes. The acoustic driver 150 may be acoustically coupled to at least two second sound guiding holes (such as two second sound guiding holes 157) (for example, connected to the two second sound guiding holes 157 via two acoustic routes 155, respectively). Then the acoustic driver 150 may propagate sound through the at least two second sound guiding holes. In some embodiments, in order to reduce the far-field leakage of the acoustic output apparatus 100, the acoustic driver 140 may be used to generate low-frequency sounds with equal (or approximately equal) amplitude and opposite (or approximately opposite) phases at the at least two first sound guiding holes, respectively. The acoustic driver 150 may be used to generate high-frequency sounds with equal (or approximately equal) amplitude and opposite (or approximately opposite) phases at the at least two second sound guiding holes, respectively. In this way, the far-field leakage of low-frequency sounds (or high-frequency sounds) may be reduced according to the principle of acoustic interference cancellation. In some embodiments, according to FIG. 2, FIG. 3A, and FIG. 3B, further considering that the wavelength of the low-frequency sound is longer than that of the high-frequency sound, and in order to reduce the interference cancellation of the sound in the near-field (for example, the position of the user's ear), the parameters of the sound output from the two first sound guiding holes and the parameters of the sound output from the two second sound guiding holes may be set to be different values. For example, assuming that there is a first amplitude ratio between the two first sound guiding holes and a second amplitude ratio between the two second sound guiding holes, the first amplitude ratio may be greater than the second amplitude ratio. As another example, assuming that there is an absolute value of a first phase difference between the two first sound guiding holes and an absolute value of a second phase difference between the two second sound guiding holes, the absolute value of the first phase difference may be less than the absolute value of the second phase difference. More details of the parameters of the dual-point sound source may be disclosed elsewhere in the present disclosure (such as FIG. 5 and FIG. 9, and the descriptions thereof).

As shown in FIG. 4, the acoustic driver 140 may include a transducer 143. The transducer 143 may transmit sound to the first sound guiding holes 147 through the acoustic route 145. The acoustic driver 150 may include a transducer 153. The transducer 153 may transmit sound to the second sound guiding holes 157 through the acoustic route 155. In some embodiments, the transducer may include, but not be limited to, a transducer of a gas-conducting acoustic output apparatus, a transducer of a bone-conducting acoustic output apparatus, a hydroacoustic transducer, an ultrasonic transducer, or the like, or any combination thereof. In some embodiments, the transducer may be of a moving coil type, a moving iron type, a piezoelectric type, an electrostatic type, or a magneto strictive type, or the like, or any combination thereof.

In some embodiments, the acoustic drivers (such as the low-frequency acoustic driver 140, the high-frequency acoustic driver 150) may include transducers with different properties or numbers. For example, each of the low-frequency acoustic driver 140 and the high-frequency acoustic driver 150 may include a transducer having different frequency response characteristics (such as a low-frequency speaker unit and a high-frequency speaker unit). As another example, the low-frequency acoustic driver 140 may include two transducers (such as two low-frequency speaker units), and the high-frequency acoustic driver 150 may include two transducers 153 (such as two high-frequency speaker units).

In some alternative embodiments, the acoustic output apparatus 100 may generate sound with different frequency ranges by other means. For example, transducer frequency division, acoustic route frequency division, or the like. When the acoustic output apparatus 100 uses a transducer or an acoustic route to divide the sound, the electronic frequency division module 110 (the part inside the dotted frame) may be omitted. When the acoustic output apparatus 100 uses a transducer to achieve signal frequency division, the acoustic driver 140 and the acoustic driver 150 may convert the input sound source signal into a low-frequency sound and a high-frequency sound, respectively. Specifically, through the transducer 143 (such as a low-frequency speaker), the low-frequency acoustic driver 140 may convert the source signal into the low-frequency sound with low-frequency components. The low-frequency sound may be transmitted to the at least two first sound guiding holes 147 along at least two different acoustic routes. Then the low-frequency sound may be propagated outwards through the first sound guiding holes 147. Through the transducer 153 (such as a high-frequency speaker), the high-frequency acoustic driver 150 may convert the source signal into the high-frequency sound with high-frequency components. The high-frequency sound may be transmitted to the at least two second sound guiding holes 157 along at least two different acoustic routes. Then the high-frequency sound may be propagated outwards through the second sound guiding holes 157.

In some alternative embodiments, an acoustic route (e.g., the acoustic route 145 and the acoustic route 155) connecting a transducer and sound guiding holes may affect the nature of the transmitted sound. For example, an acoustic route may attenuate or change the phase of the transmitted sound to some extent. In some embodiments, an acoustic route may include a sound tube, a sound cavity, a resonance cavity, a sound hole, a sound slit, or a tuning network, or the like, or any combination thereof. In some embodiments, the acoustic route may also include an acoustic resistance material, which may have a specific acoustic impedance. For example, the acoustic impedance may be in the range of 5 MKS Rayleigh to 500 MKS Rayleigh. The acoustic resistance materials may include, but not be limited to, plastic, textile, metal, permeable material, woven material, screen material or mesh material, porous material, particulate material, polymer material, or the like, or any combination thereof. By setting the acoustic routes of different acoustic impedances, the acoustic output of the transducer may be acoustically filtered, such that the sounds output through different acoustic routes may have different components (e.g., phases, amplitudes, frequencies, etc.).

In some alternative embodiments, the acoustic output apparatus 100 may utilize acoustic routes to achieve signal frequency division. Specifically, the source signal may be input into a specific acoustic driver and converted into a sound containing high and low-frequency components. The sound signal may be propagated along acoustic routes having different frequency selection characteristics. For example, the sound signal may be propagated along the acoustic route with a low-pass characteristic to the corresponding sound guiding hole to generate low-frequency sound. In this process, the high-frequency sound may be absorbed or attenuated by the acoustic route with a low-pass characteristic. Similarly, the sound signal may be propagated along the acoustic route with a high-pass characteristic to the corresponding sound guiding hole to generate a high-frequency sound. In this process, the low-frequency sound may be absorbed or attenuated by the acoustic route with the high-pass characteristic.

The sound guiding holes (e.g., the first sound guiding holes 147, the second sound guiding holes 157) may be small holes formed on the acoustic output apparatus with specific openings and allowing sound to pass. The shape of the sound guiding hole may include one of a circle shape, an oval shape, a square shape, a trapezoid shape, a rounded quadrangle shape, a triangle shape, an irregular shape, or any combination thereof. In addition, the number of sound guiding holes connected to the acoustic driver 140 or 150 may not be limited to two, which may be an arbitrary value instead, for example, three, four, six, or the like. In some embodiments, the acoustic route between the same acoustic driver and its corresponding different sound guiding hole may be designed according to different situations. For example, by setting the shape and/or size of the first sound guiding hole 147 (or the second sound guiding hole 157), or by setting a lumen structure or acoustically damping material with a certain damping in the acoustic route, the acoustic route between the same acoustic driver and its corresponding different sound guiding hole may be configured to have approximately same equivalent acoustic impedance. In this case, as the same acoustic driver outputs two groups of sounds with the same amplitude and opposite phases, these two groups of sounds may still have the same amplitude and opposite phase when they reach the corresponding sound guiding hole through different acoustic routes. In some embodiments, the first sound guiding holes and the second sound guiding holes may have the same or different structures. For example, the number or count of the first sound guiding holes may be two, and the number or count of the second sound guiding holes may be four. As another example, the shapes of the first sound guiding holes and the second sound guiding holes may be the same or different.

In some embodiments, the acoustic output apparatus 100 may include a controller (not shown in figure). The controller may cause the low-frequency acoustic driver 140 to output a sound in the first frequency range (i.e., low-frequency sound), and cause the high-frequency acoustic driver 150 to output a sound in the second frequency range (i.e., high-frequency sound). In some embodiments, the acoustic output apparatus 100 may also include a supporting structure. The supporting structure may be used to support the acoustic driver (such as the high-frequency acoustic driver 150, the low-frequency acoustic driver 140), so that the sound guiding holes corresponding to the acoustic driver is positioned away from the user's ear. In some embodiments, the sound guiding holes acoustically coupled with the high-frequency acoustic driver 150 may be located closer to an expected position of the user's ear (for example, the ear canal entrance), while the sound guiding holes acoustically coupled with the low-frequency acoustic driver 140 may be located further away from the expected position. In some embodiments, the supporting structure may be used to package the acoustic driver. The supporting structure of the packaged acoustic driver may be a casing made of various materials such as plastic, metal, tape, etc. The casing may encapsulate the acoustic driver and form a front chamber and a rear chamber corresponding to the acoustic driver. The front chamber may be acoustically coupled to one of the at least two sound guiding holes. The rear chamber may be acoustically coupled to the other of the at least two sound guiding holes. For example, the front chamber of the low-frequency acoustic driver 140 may be acoustically coupled to one of the at least two first sound guiding holes 147. The rear chamber of the low-frequency acoustic driver 140 may be acoustically coupled to the other of the at least two first sound guiding holes 147. The front chamber of the high-frequency acoustic driver 150 may be acoustically coupled to one of the at least two second sound guiding holes 157. The rear chamber of the high-frequency acoustic driver 150 may be acoustically coupled to the other of the at least two second sound guiding holes 157. In some embodiments, the sound guiding holes (such as the first sound guiding holes 147 and the second sound guiding holes 157) may be disposed on the casing.

The above description of the acoustic output apparatus 100 may be merely by way of example. Those skilled in the art may make adjustments and changes to the structure, quantity, etc. of the acoustic driver, which is not limiting in the present disclosure. In some embodiments, the acoustic output apparatus 100 may include any number of the acoustic driver structures. For example, the acoustic output apparatus 100 may include two groups of the high-frequency acoustic drivers 150 and two groups of the low-frequency acoustic drivers 140, or one group of the high-frequency acoustic drives 150 and two groups of the low-frequency acoustic drivers 140, and these high-frequency/low-frequency drivers may be used to generate a sound in a specific frequency range. As another example, the acoustic driver 140 and/or the acoustic driver 150 may include an additional signal processor. The signal processor may have the same or different structural components as the signal processor 120 or 130.

It should be noted that the acoustic output apparatus and its modules are shown in FIG. 4 may be implemented in various ways. For example, in some embodiments, the system and the modules may be implemented by hardware, software, or a combination of both. The hardware may be implemented by a dedicated logic. The software may be stored in the storage which may be executed by a suitable instruction execution system, for example, a microprocessor or dedicated design hardware. It will be appreciated by those skilled in the art that the above methods and systems may be implemented by computer-executable instructions and/or embedded in the control codes of a processor. For example, the control codes may be provided by a medium such as a disk, a CD, or a DVD-ROM, a programmable memory device, such as a read-only memory (e.g., firmware), or a data carrier such as an optical or electric signal carrier. The system and the modules in the present disclosure may be implemented not only by a hardware circuit in a programmable hardware device in an ultra-large scale integrated circuit, a gate array chip, a semiconductor such a logic chip or a transistor, a field programmable gate array, or a programmable logic device. The system and the modules in the present disclosure may also be implemented by software to be performed by various processors, and further also by a combination of hardware and software (e.g., firmware).

It should be noted that the above description of the acoustic output apparatus 100 and its components is only for the convenience of description, and not intended to limit the scope of the present disclosure. It may be understood that, for those skilled in the art, after understanding the principle of the apparatus, it is possible to combine each unit or form a substructure to connect with other units arbitrarily without departing from this principle. For example, the signal processor 120 or 130 may be a part independent of the electronic frequency division module 110. Those modifications may fall within the scope of the present disclosure.

When the acoustic driver (for example, the low-frequency acoustic driver 140, the high-frequency acoustic driver 150) outputs sounds through at least two sound guiding holes (for example, the at least two first sound guiding holes 147, the at least two second sound guiding holes 157), the at least two sound guiding holes may output sounds with the same or different sound amplitudes. For example, for the two first sound guiding holes 147 outputting low-frequency sounds with different sound amplitudes, when an amplitude ratio of a low-frequency sound with a greater amplitude to a low-frequency sound with a less amplitude increases, according to FIG. 3A, an increase of the near-field hearing sound of the acoustic output apparatus may be greater than an increase of the far-field leaked sound, which may achieve an output of a higher hearing sound volume and a lower leaked sound volume in the low-frequency band. As another example, for the two second sound guiding holes 157 outputting high-frequency sounds with different sound amplitudes, when an amplitude ratio of a high-frequency sound with a greater amplitude to a high-frequency sound with a less amplitude increases, according to FIG. 3A, an increase of the near-field hearing sound of the acoustic output apparatus may be greater than an increase of the far-field leaked sound, which may achieve an output of a higher hearing sound volume output and a lower leaked sound volume in the high-frequency band. Therefore, by reasonably designing the structure of the electronic frequency division module, the transducers, the acoustic routes, or the sound guiding holes, the amplitude ratio of the high-frequency sounds at the sound guiding holes (i.e., the high-frequency dual-point sound source) corresponding to the high-frequency acoustic driver and the amplitude ratio of the low-frequency sounds at the sound guiding holes (i.e., the low-frequency dual-point sound source) corresponding to the low-frequency acoustic driver may satisfy a certain condition, which may make the acoustic output apparatus have a better sound output effect.

In some embodiments, it is assumed that there is a first amplitude ratio between the low-frequency sound with a greater amplitude and the low-frequency sound with a less amplitude in the low-frequency dual-point sound source, and there is a second amplitude ratio between the high-frequency sound with a greater amplitude and the high-frequency sound with a less amplitude of the high-frequency dual-point sound source. The first amplitude ratio and the second amplitude ratio may be any values. In some embodiments, the first amplitude ratio may not be less than 1, the second amplitude ratio may not be greater than 5, and the first amplitude ratio may be greater than the second amplitude ratio. In some embodiments, the first amplitude ratio may not be less than 1, the second amplitude ratio may not be greater than 4, and the first amplitude ratio may be greater than the second amplitude ratio. In some embodiments, the first amplitude ratio may not be less than 1.2, the second amplitude ratio may not be greater than 3, and the first amplitude ratio may be greater than the second amplitude ratio. In some embodiments, the first amplitude ratio may not be less than 1.3, the second amplitude ratio may not be greater than 2, and the first amplitude ratio may be greater than the second amplitude ratio. In some embodiments, the first amplitude ratio may not be less than 1.3, the second amplitude ratio may not be greater than 1.5, and the first amplitude ratio may be greater than the second amplitude ratio. In some embodiments, the first amplitude ratio may be in a range of 1-3, and the second amplitude ratio may be in a range of 1-2. In some embodiments, the first amplitude ratio may be at least 1.2 times the second amplitude ratio. In some embodiments, the first amplitude ratio may be at least 1.5 times the second amplitude ratio. In some embodiments, the first amplitude ratio may be at least two times the second amplitude ratio.

Figure 5:
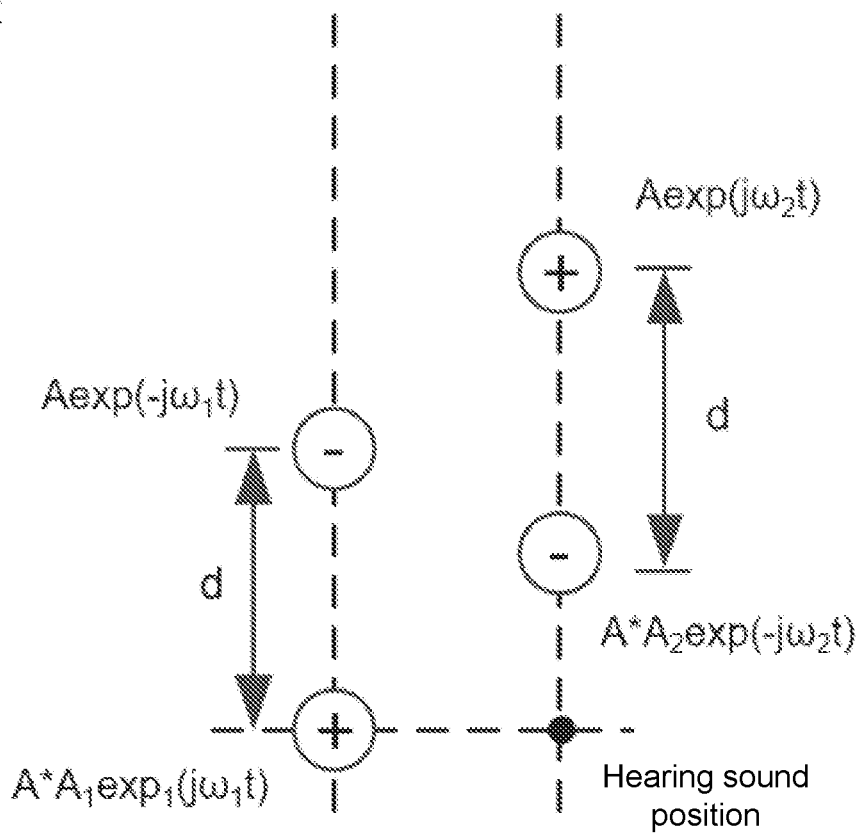
FIG. 5 is a schematic diagram illustrating two dual-point sound sources according to some embodiments of the present disclosure.

The influence of the amplitude ratio between sound sources of the dual-point sound source on the output sound of the acoustic output apparatus may be further described based on the two dual-point sound sources shown in FIG. 5.

As shown in FIG. 5, a dual-point sound source on the left (outputting low-frequency sounds with frequency of $\omega_1$) represents an equivalent of two sound guiding holes corresponding to a low-frequency acoustic driver, and a dual-point sound source on the right (outputting high-frequency sounds with frequency of $\omega_2$) represents an equivalent of two sound guiding holes corresponding to a high-frequency acoustic driver. For simplicity, it is assumed that the high-frequency dual-point sound source and the low-frequency dual-point sound source may have the same spacing d. It should be noted that in an actual acoustic output apparatus, the acoustic output apparatus may be set in combination with the spacing relationship between the low-frequency dual-point sound source and the high-frequency dual-point sound source described elsewhere in the present disclosure (for example, a distance between the low-frequency dual-point sound source is greater than a distance between the high-frequency dual-point sound source), which are not limited here.

The high-frequency dual-point sound source and the low-frequency dual-point sound source may respectively output a group of high-frequency sounds with opposite phases and a group of low-frequency sounds with opposite phases. An amplitude ratio of a point sound source with a greater amplitude to a point sound source with a less amplitude in the low-frequency dual-point sound source may be $A_1$, and an amplitude ratio of a point sound source with a greater amplitude to a point sound source with a less amplitude in the high-frequency dual-point sound source may be $A_2$, and $A_1 > A_2$. According to FIG. 5, a position for hearing sound (also referred to as a hearing sound position) is on a line where the high-frequency dual-point sound source is located, and a line connecting the hearing sound position with a point sound source of the low-frequency dual-point sound source may be perpendicular to a line where the low-frequency dual-point sound source is located. It should be understood that the selection of the hearing sound position here may be merely used as an example, and is not a limitation of the present disclosure. In some alternative embodiments, the hearing sound position may be any suitable position. For example, the hearing sound position may be located on the center line of a dual-point sound source. As another example, the hearing sound position may be located on the vertical line of a dual-point sound source. As a further example, the hearing sound position may be located on a circle centered on the center of a dual-point sound source.

In some embodiments, an amplitude ratio that meets a requirement may be obtained by adjusting structural parameters of different components in the acoustic output apparatus. For example, the amplitudes of sounds output at sound guiding holes may be changed by adjusting the acoustic impedances of the acoustic routes. For instance, one or more damping materials such as tuning nets, tuning cotton, etc., may be added to the acoustic route 145 or 155 to change its acoustic impedance. Assuming that an acoustic impedance ratio of the front and rear chambers of the low-frequency acoustic driver is a first acoustic impedance ratio, and an acoustic impedance ratio of the front and the back chambers of the high-frequency acoustic driver is a second acoustic impedance ratio, in some embodiments, the first acoustic impedance ratio and the second acoustic impedance ratio may be arbitrary values, and the first acoustic impedance ratio may be greater than, less than, or equal to the second acoustic impedance ratio. In some embodiments, the first acoustic impedance ratio may not be less than 0.1, and the second acoustic impedance ratio may not be greater than 3. In some embodiments, the first acoustic impedance ratio may not be less than 0.3, and the second acoustic impedance ratio may not be greater than 2. In some embodiments, the first acoustic impedance ratio may not be less than 0.5, and the second acoustic impedance ratio may not be greater than 1.5. In some embodiments, the first acoustic impedance ratio and the second acoustic impedance ratio may be in a range of 0.8-1.2. In some embodiments, the first acoustic impedance ratio may be in a range of 0.5-1.6, and the second acoustic impedance ratio may be in a range of 0.6-1.5. In some embodiments, the first acoustic impedance ratio may be in a range of 1.0-1.5, and the second acoustic impedance ratio may be in a range of 0.7-1.3.

In some alternative embodiments, an acoustic impedance of an acoustic route may be changed by adjusting a diameter of a sound guiding tube corresponding to the acoustic route in the acoustic output apparatus, so as to achieve the purpose of adjusting the sound amplitude at the sound guiding hole. In some embodiments, a ratio of tube diameters (also referred to as a diameter ratio for brevity) (i.e., a ratio of a tube diameter of a sound guiding tube with a smaller radius to a tube diameter of a sound guiding tube with a larger radius) of the two sound guiding tubes in the low-frequency acoustic driver may be set in the range of 0.8-1.0. In some embodiments, the ratio of the tube diameters of the two sound guiding tubes in the low-frequency acoustic driver may be set in the range of 0.95-1.0. In some embodiments, tube diameters of two sound guiding tubes in the high-frequency acoustic driver may be set to be the same.

In some embodiments, the internal friction or viscous force of the medium in the sound guiding tube may have a significant impact on the propagation of sound. If the tube diameter of the sound guiding tube is too small, it may cause excessive sound loss and reduce the volume of the sound at the sound guiding hole. The influence of the tube diameter of the sound guiding tube on the sound volume may be further described based on the following descriptions about the tube diameter of the sound guiding tube at different frequencies in conjunction with FIGS. 6A and 6B.

Figure 6A:
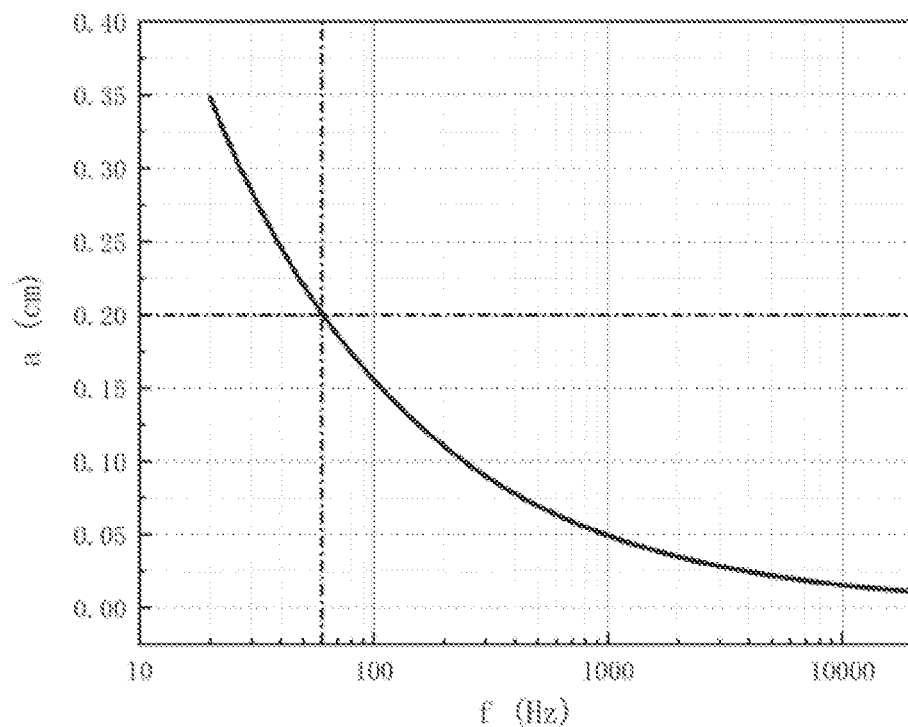
FIG. 6A is a graph illustrating variations of parameters of a sound guiding tube for different sound frequencies according to some embodiments of the present disclosure.

FIG. 6A is a graph illustrating variations of parameters of a sound guiding tube for different sound frequencies according to some embodiments of the present disclosure. FIG. 6A shows a curve of a minimum value of the tube diameter of the sound guiding tube for different sound frequencies. The ordinate is the minimum value of the tube diameter of the sound guiding tube, in centimeter (cm), and the abscissa is the sound frequency, in hertz (Hz). As shown in FIG. 6A, when the sound frequency is in a range of 20 Hz to 20 kHz, the tube diameter (or equivalent radius) of the sound guiding tube may not be less than 3.5 mm. When the sound frequency is in a range of 60 Hz to 20 kHz, the tube diameter (or equivalent radius) of the sound guiding tube may not be less than 2 mm. Therefore, to reduce the loss of the sound within the audible range of the human ear output by the acoustic output apparatus due to the sound guiding tube with a small diameter, the tube diameter of the sound guiding tube corresponding to the acoustic route in the acoustic output apparatus may be not less than 1.5 mm, or not less than 2 mm, or not less than 2.5 mm.

Figure 6B:
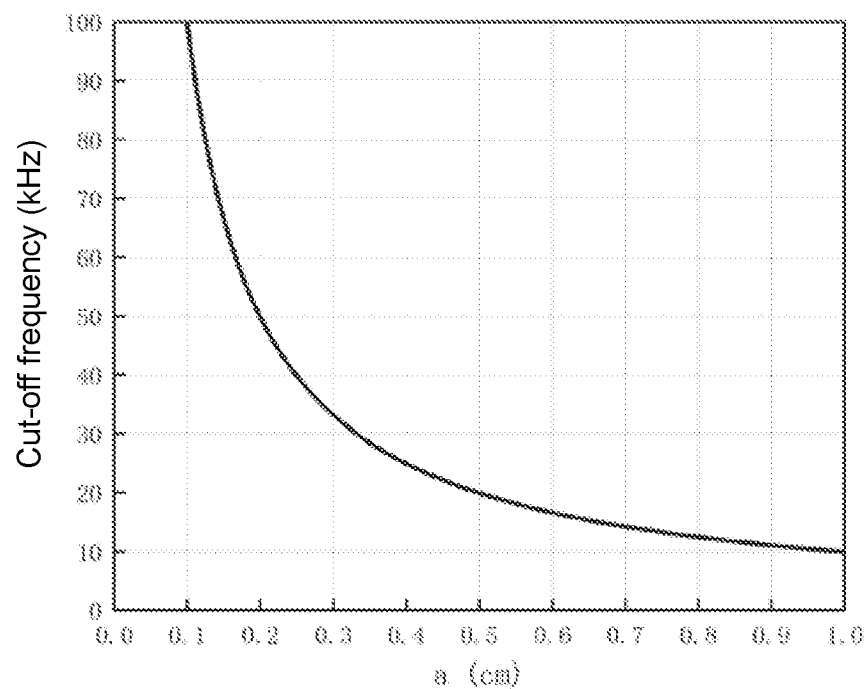
FIG. 6B is a graph illustrating variations of parameters of a sound guiding tube for different sound frequencies according to some embodiments of the present disclosure.

In some embodiments, when the tube diameter of the sound guiding tube is too large, and a frequency of the transmitted sound is higher than a certain frequency, high-order waves may be generated in the sound guiding tube, which may affect the sound that eventually propagates outward from the sound guiding hole. Therefore, the design of the sound guiding tube needs to ensure that no high-order waves are generated in the frequency range of the sound to be transmitted, but only plane waves propagating in the direction of the sound guiding tube. FIG. 6B is a graph illustrating variations of parameters of a sound guiding tube for different sound frequencies according to some embodiments of the present disclosure. FIG. 6B shows a curve of a maximum value of the tube diameter of the sound guiding tube for different upper cut-off frequencies of sound transmission. The abscissa is the maximum value of the tube diameter of the sound guiding tube, in centimeter (cm), and the ordinate is the upper cut-off frequency of sound transmission, in kilohertz (kHz). As shown in FIG. 6B, when the upper cut-off frequency of sound transmission is 20 kHz, the tube diameter (or equivalent radius) of the sound guiding tube may not be greater than 5 mm. When the upper cut-off frequency of sound transmission is 10 kHz, the tube diameter (or equivalent radius) of the sound guiding tube may not be greater than 9 mm. Therefore, in order to ensure that the acoustic output apparatus does not generate high-order waves when outputting sounds within the audible range of human ears, the tube diameter of the sound guiding tube corresponding to the acoustic route in the acoustic output apparatus may not be greater than 10 mm, or not greater than 8 mm, etc.

In some embodiments, the acoustic impedance of the acoustic route may be changed by adjusting the length of the sound guiding tube corresponding to the acoustic route in the acoustic output apparatus, to achieve the purpose of adjusting the sound amplitude at the sound guiding hole. The length and the aspect ratio (i.e., a ratio of length to diameter) of the sound guiding tube may affect the transmitted sound. Merely by way of example, a sound pressure of the sound transmitted by the sound guiding tube, the length, and the radius of the sound guiding tube may satisfy Equation (5):

$$|P|=|P_0|\exp(-\beta L), \qquad (5)$$

where $P_0$ denotes the sound pressure of the sound source, L denotes the length of the sound guiding tube, and $\beta$ may satisfy Equation (6):

$$\beta = \frac{1}{ac_0}\sqrt{\frac{\omega}{2}\cdot\frac{\eta}{\rho_0}}, \qquad (6)$$

where a denotes the radius of the sound guiding tube, $c_0$ denotes a propagation speed of sound, $\omega$ denotes an angular frequency of the sound wave, and $\eta/\rho_0$ denotes the dynamic viscosity of the medium. For different tube diameters of the sound guiding tube, the attenuation degree of sounds with different frequencies may be related to the length and aspect ratio of the sound guiding tube as described in FIG. 7.

Figure 7:
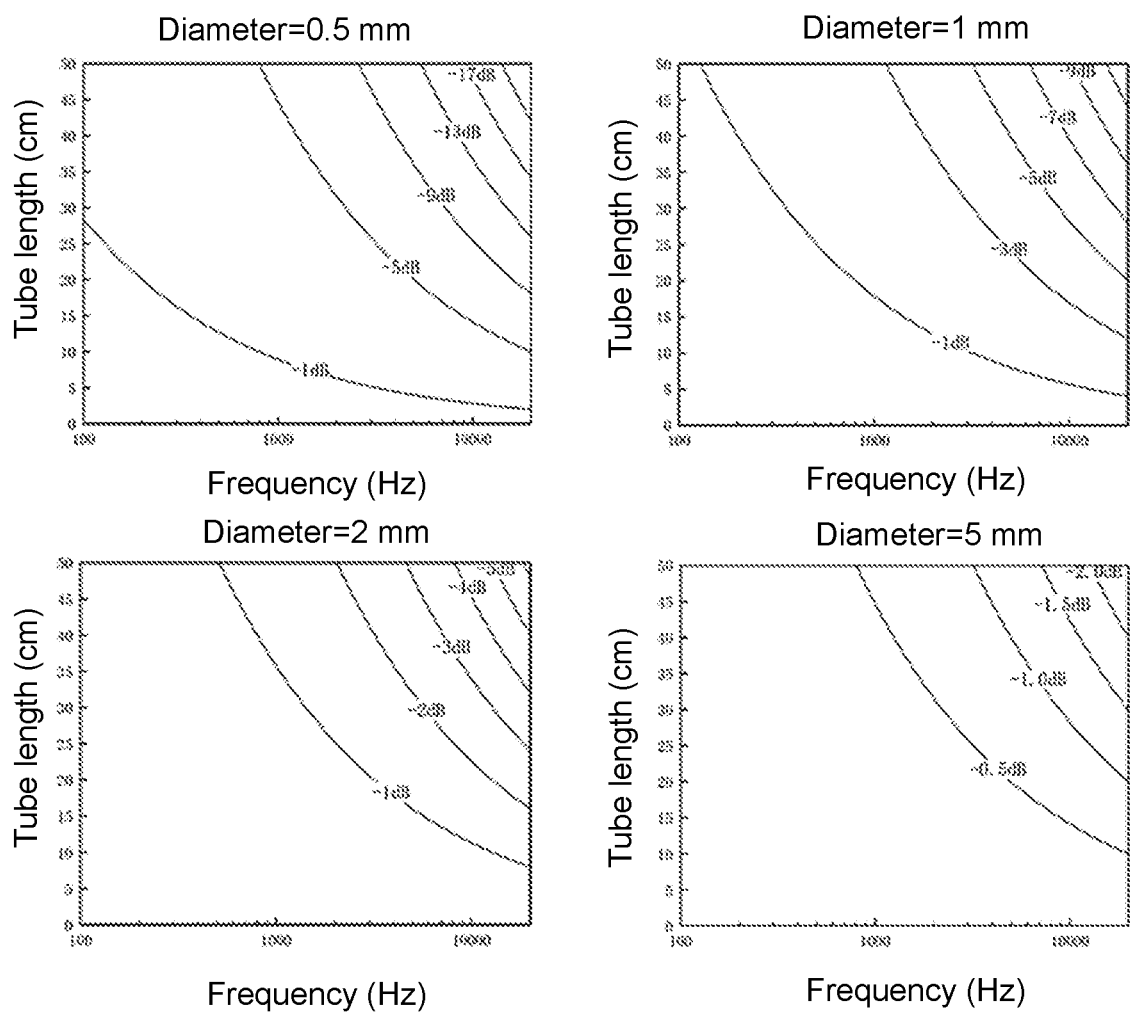
FIG. 7 is a graph illustrating variations of sound output relative to the length and the diameter of the sound guiding tube according to some embodiments of the present disclosure.

As shown in FIG. 7, when the tube diameter of the sound guiding tube is constant, the greater the length (or aspect ratio) of the sound guiding tube, the greater the attenuation degree of sounds transmitted in the sound guiding tube may be, and the sound in the high-frequency band may have a greater attenuation degree than the sound in the low-frequency band. Therefore, to ensure that the sound attenuation of the acoustic output apparatus is not too large to affect the hearing sound volume, the aspect ratio of the sound guiding tube corresponding to the acoustic route in the acoustic output apparatus may be not greater than 200, or not greater than 150, or not greater than 100, etc.

Figure 8:
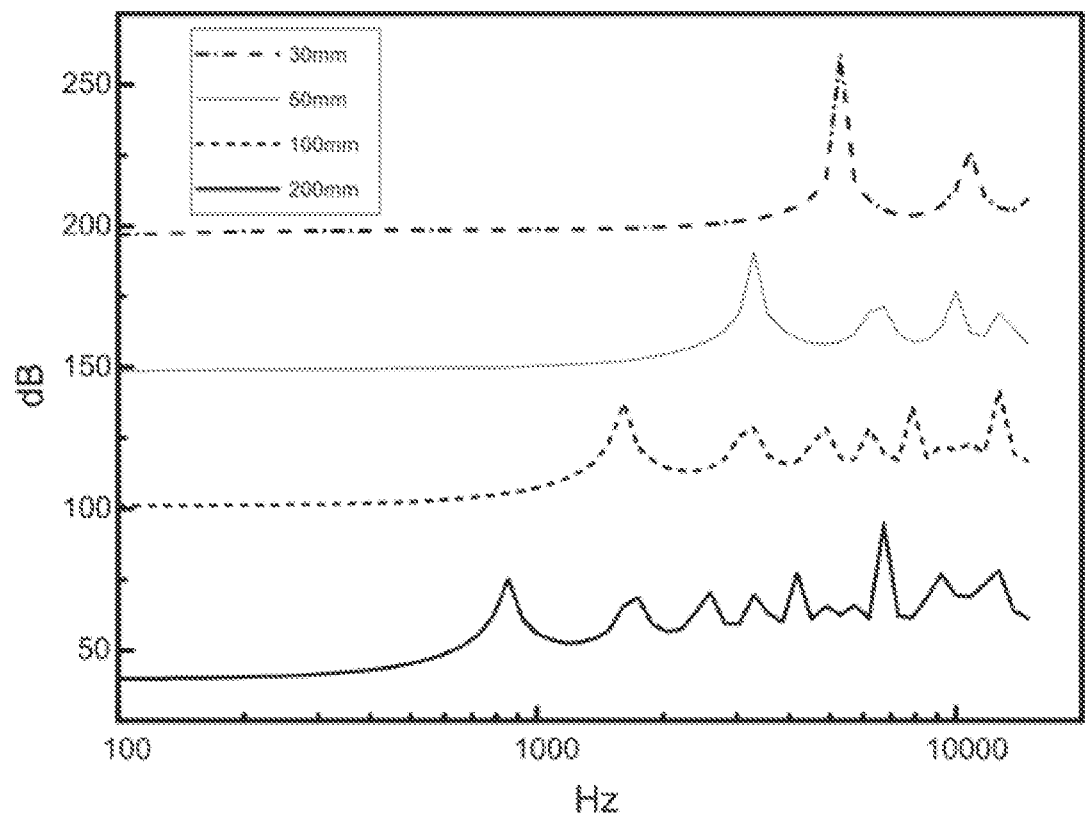
FIG. 8 is a graph illustrating a change of a sound pressure of sound output by a sound guiding tube with different lengths according to some embodiments of the present disclosure.

In some embodiments, due to the interaction between the sound guiding tube and the radiation impedance of the nozzle of the sound guiding tube, a sound of a specific frequency transmitted in the sound guiding tube may form a standing wave therein, causing the output sound to form peaks/valleys at certain frequencies, and affecting the sound output effect. The length of the sound guiding tube may affect the formation of standing waves. FIG. 8 is a graph illustrating a change of a sound pressure of sound output by a sound guiding tube with different lengths according to some embodiments of the present disclosure. As shown in FIG. 8, curves of relative values of sound pressure output by sound guiding tubes of different lengths are shown. According to FIG. 8, the longer the length of the sound guiding tube, the lower the minimum frequency of the peaks/valleys of sound outputted by the sound guiding tube may be, and the greater the count of the peaks/valleys may be. In order to reduce the influence of the peaks/valleys on the sound output effect, the length of the sound guiding tube may be adjusted to meet certain conditions. In some embodiments, the length of the sound guiding tube may not be greater than 200 mm, so that the output sound is relatively flat in the range of 20 Hz to 800 Hz. In some embodiments, the length of the sound guiding tube may not be greater than 100 mm, so that the output sound is flat and without peaks and valleys in the range of 20 Hz to 1500 Hz. In some embodiments, the length of the sound guiding tube may not be greater than 50 mm, so that the output sound is flat and without peaks and valleys in the range of 20 Hz to 3200 Hz. In some embodiments, the length of the sound guiding tube may not be greater than 30 mm, so that the output sound is flat and without peaks and valleys in the range of 20 Hz to 5200 Hz.

In some embodiments, the length and the tube diameter (or radius) of the sound guiding tube may be adjusted at the same time to satisfy certain conditions. In some embodiments, the tube diameter of the sound guiding tube may not be less than 0.5 mm, and the length of the sound guiding tube may not be greater than 150 mm. In some embodiments, the tube diameter of the sound guiding tube may not be less than 0.5 mm, and the length of the sound guiding tube may not be greater than 100 mm. In some embodiments, the tube diameter of the sound guiding tube may not be less than 1 mm, and the length of the sound guiding tube may not be greater than 200 mm. In some embodiments, the tube diameter of the sound guiding tube may not be less than 1 mm, and the length of the sound guiding tube may not be greater than 150 mm. In some embodiments, the tube diameter of the sound guiding tube may not be less than 2 mm, and the length of the sound guiding tube may not be greater than 300 mm. In some embodiments, the tube diameter of the sound guiding tube may not be less than 5 mm, and the length of the sound guiding tube may not be greater than 500 mm. In some embodiments, the tube diameter of the sound guiding tube may not be less than 5 mm, and the length of the sound guiding tube may not be greater than 350 mm.

In some embodiments, the setting of the amplitude ratio of sound sources of the dual-point sound source may be achieved by adjusting the structure of the sound guiding holes in the acoustic output apparatus. For example, the two sound guiding holes corresponding to each acoustic driver of the acoustic output apparatus may be respectively set to different sizes, different areas, and/or different shapes. As another example, the sizes of the second sound guiding holes corresponding to the high-frequency acoustic driver and the sizes of the first sound guiding holes corresponding to the low-frequency acoustic driver may be different. As a further example, the sound guiding holes corresponding to different acoustic drivers of the acoustic output apparatus may be set to different counts.

It should be noted that the foregoing description of the acoustic output apparatus is merely for example and description, and does not limit the scope of the present disclosure. For those skilled in the art, various modifications and changes may be made to the acoustic output apparatus under the guidance of the present disclosure. However, these modifications and changes are still within the scope of the present disclosure.

When an acoustic driver (for example, the low-frequency acoustic driver 140, the high-frequency acoustic driver 150) outputs sounds through at least two sound guiding holes (for example, the at least two first sound guiding holes 147, the at least two second sound guiding holes 157), the at least two sound guiding holes may output sounds with the same or different phases. For example, when low-frequency sounds with different phases are output from the two first sound guiding holes 147, and an absolute value of the phase difference of the low-frequency sounds approaches 170 degrees, according to the description of FIG. 3B, the acoustic output apparatus may produce a larger hearing sound volume while maintaining the far-field leaked sound volume. As another example, when high-frequency sounds with different phases are output from the two second sound guiding holes 157, and an absolute value of the phase difference of the high-frequency sounds approaches 170 degrees, according to the description of FIG. 3B, the acoustic output apparatus may produce a smaller leaked sound volume while maintaining the near-field hearing sound volume. Therefore, by reasonably designing the structures of the electronic frequency division module, the transducers, the acoustic routes, or the sound guiding holes, a phase difference between high-frequency sounds at the sound guiding holes (i.e., the high-frequency dual-point sound source) corresponding to the high-frequency acoustic driver and a phase difference between the low-frequency sounds at the sound guiding holes (i.e., the low-frequency dual-point sound source) corresponding to the low-frequency acoustic driver may meet a certain condition, which may make the acoustic output apparatus have a better sound output effect.

Figure 9:
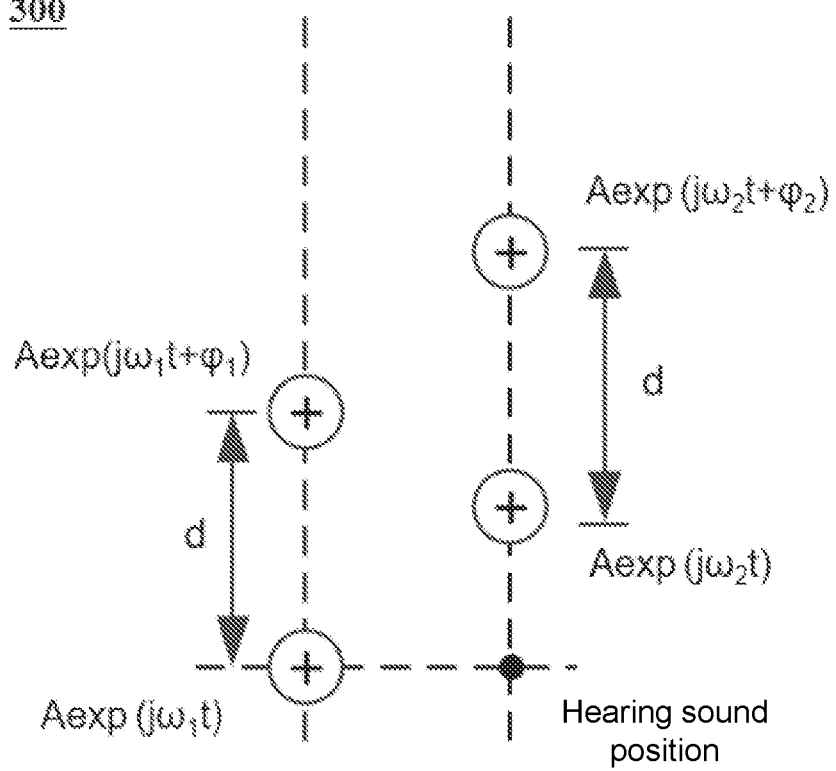
FIG. 9 is a schematic diagram illustrating two dual-point sound sources according to some embodiments of the present disclosure.

The influence of the phase difference between the dual-point sound source on the output sound of the acoustic output apparatus may be further described based on the two dual-point sound sources shown in FIG. 9.

FIG. 9 is a schematic diagram illustrating two dual-point sound sources according to some embodiments of the present disclosure. As shown in FIG. 9, a dual-point sound source on the left represents an equivalent of two sound guiding holes corresponding to a low-frequency acoustic driver, and a dual-point sound source on the right represents an equivalent of two sound guiding holes corresponding to a high-frequency acoustic driver. For simplicity, it is assumed that the high-frequency dual-point sound source and the low-frequency dual-point sound source may have the same spacing d. It should be noted that in an actual acoustic output apparatus, the acoustic output apparatus may be set in combination with the spacing relationship between the low-frequency dual-point sound source and the high-frequency dual-point sound source described elsewhere in the present disclosure, which is not limited here.

For the sake of simplicity, the high-frequency dual-point sound source and the low-frequency dual-point sound source may respectively output a set of high-frequency sounds with the same amplitude and a certain phase difference and a set of low-frequency sounds with the same amplitude and a certain phase difference. In some embodiments, by reasonably designing the phase difference between the high-frequency sounds output by the high-frequency dual-point sound source and/or the phase difference between the high-frequency sounds output by the low-frequency dual-point sound source, the dual-point sound sources may achieve a stronger leakage reduction ability than a single-point sound source. As shown in FIG. 9, a position for hearing sound (also referred to as a hearing sound position) is on a line where the high-frequency dual-point sound source is located, and a line connecting the hearing sound position with a point sound source of the low-frequency dual-point sound source may be perpendicular to a line where the low-frequency dual-point sound source is located. It should be understood that the selection of the hearing sound position here may be merely used as an example, and is not a limitation of the present disclosure. In some alternative embodiments, the hearing sound position may be any suitable position. For example, the hearing sound position may be located on the center line of a dual-point sound source. As another example, the hearing sound position may be located on the vertical line of a dual-point sound source. As a further example, the hearing sound position may be located on a circle centered on the center of a dual-point sound source.

As shown in FIG. 9, a phase difference between a far-ear sound source (i.e., the point sound source on the upper left side) and a near-ear sound source (i.e., the point sound source on the lower left side) in the low-frequency dual-point sound source may be denoted as $\varphi_1$, a phase difference between a far-ear sound source (i.e., the point sound source on the upper right side) and a near-ear sound source (i.e., the point sound source on the lower right side) in the high-frequency dual-point sound source may be denoted as $\varphi_2$, and $\varphi_1$ and $\varphi_2$ may satisfy Equation (7):

$$|180°-\varphi_1|>|180°-\varphi_2|, \tag{7}$$

In some embodiments, a phase difference that meets a requirement may be obtained by adjusting structural parameters of different components in the acoustic output apparatus. For example, the phases of sounds output at sound guiding holes may be changed by adjusting sound paths from the transducer to the corresponding sound guiding hole in the acoustic output apparatus. As used herein, a sound path refers to a length of an acoustic route. In some embodiments, a sound path ratio of two sound guiding tubes corresponding to the low-frequency acoustic driver may be in the range of 0.4-2.5, and sound paths of two sound guiding tubes corresponding to the high-frequency acoustic driver may be the same. In some embodiments, the sound path ratio of the two sound guiding tubes corresponding to the low-frequency acoustic driver may be in the range of 0.5-2, and the sound paths of the two sound guiding tubes corresponding to the high-frequency acoustic driver may be the same. In some embodiments, the sound path from the transducer to the sound guiding hole may be adjusted by adjusting the length of the sound guiding tube. In some embodiments, a length ratio of two sound guiding tubes (i.e., a ratio of the length of a long sound guiding tube and a length of the short sound guiding tube) corresponding to the low-frequency acoustic driver may be in the range of 0.4-2.5, and the length of the two sound guiding tubes of the high-frequency acoustic driver may be the same. In some embodiments, the length ratio of two sound guiding tubes corresponding to the low-frequency acoustic driver may be in the range of 0.8-1.25, and the length of the two sound guiding tubes corresponding to the high-frequency acoustic driver may be the same.

In some embodiments, the phase difference between at least two sound guiding holes on the acoustic output apparatus corresponding to one acoustic driver may be adjusted by adjusting the sound signal input into the acoustic driver or one or more of the above descriptions. In some embodiments, an absolute value of the phase difference of the low-frequency sounds output from the two first sound guiding holes may be less than an absolute value of the phase difference of the high-frequency sounds output from the two second sound guiding holes. In some embodiments, the phase difference of the low-frequency sounds output from the two first sound guiding holes may be in the range of 0 degrees to 180 degrees, and the phase difference of the high-frequency sounds output from the two second sound guiding holes may be in the range of 120 degrees to 180 degrees. In some embodiments, the phase difference of the low-frequency sounds output from the two first sound guiding holes may be in the range of 90 degrees to 180 degrees, and the phase difference of the high-frequency sounds output from the two second sound guiding holes may be in the range of 150 degrees to 180 degrees. In some embodiments, the phase difference of the low-frequency sounds output from the two first sound guiding holes may be in the range of 120 degrees to 180 degrees, and the phase difference of the high-frequency sounds output from the two second sound guiding holes may be in the range of 150 degrees to 180 degrees. In some embodiments, the phase difference of the low-frequency sounds output from the two first sound guiding holes may be in the range of 150 degrees to 180 degrees, and the phase difference of the high-frequency sounds output from the two second sound guiding holes may be in the range of 150 degrees to 180 degrees. In some embodiments, the phase difference of the low-frequency sounds output from the two first sound guiding holes may be in the range of 160 degrees to 180 degrees, and the phase difference of the high-frequency sounds output from the two second sound guiding holes may be in the range of 170 degrees to 180 degrees. In some embodiments, the phase difference of the low-frequency sounds output from the two first sound guiding holes and the phase difference of the high-frequency sounds output from the two second sound guiding holes may be both 180 degrees.

It should be noted that the foregoing descriptions of the acoustic output apparatus is merely for example and description, and does not limit the scope of the present disclosure. For those skilled in the art, various modifications and changes may be made to the acoustic output apparatus under the guidance of the present disclosure. However, these modifications and changes are still within the scope of the present disclosure. For example, the phase difference of sound sources of a dual-point sound source in the acoustic output apparatus may be adjusted in any reasonable manner to improve the sound leakage reduction ability of the acoustic output apparatus.

FIGS. 10A to 10D are exemplary graphs of leaked sounds of an acoustic output apparatus with two dual-point sound sources according to some embodiments of the present disclosure.

Figure 10A:
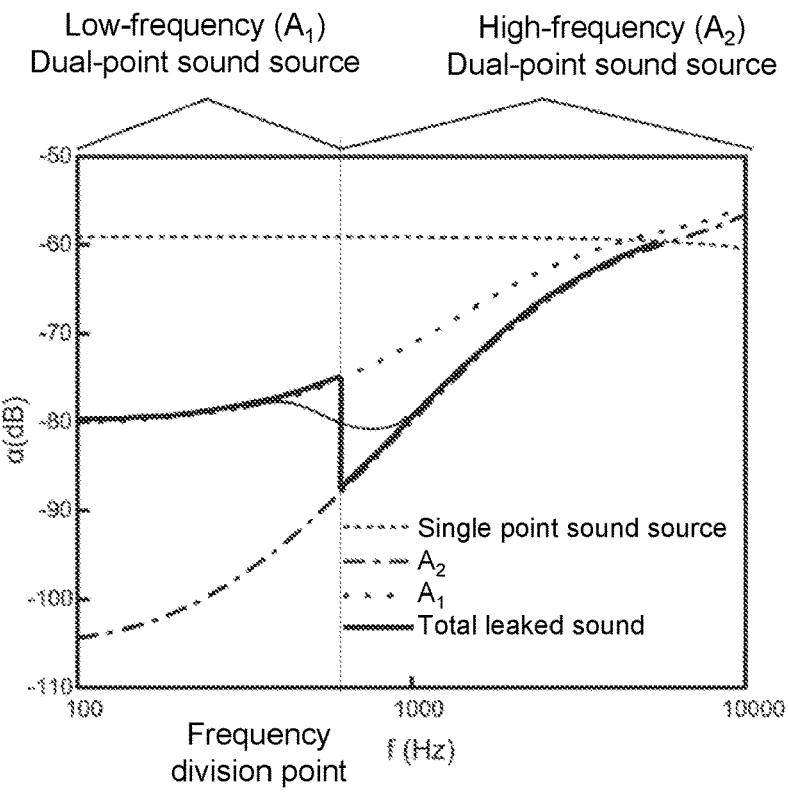
FIG. 10A is an exemplary graph of leaked sounds of an acoustic output apparatus with two dual-point sound sources according to some embodiments of the present disclosure.

As shown in FIG. 10A, compared to a single-point sound source, the leakage reduction ability may be improved by setting two dual-point sound sources with different amplitude ratios. For example, an amplitude ratio of a low-frequency dual-point sound source may be $A_1$, and an amplitude ratio of a high-frequency dual-point sound source may be $A_2$. In a low-frequency range, after adjusting an amplitude ratio of each dual-point sound source (for example, $A_1$ is set to a value greater than 1), an increase of the near-field hearing sound may be greater than an increase of the far-field leaked sound, which may produce a higher near-field hearing sound volume in the low-frequency range. Since in the low-frequency range, the far-field leaked sound of a dual-point sound source is originally very low, after adjusting the amplitude ratio of the dual-point sound source, the slightly increased leaked sound may still be kept low. In the high-frequency band, $A_2$ may be equal to or close to 1 by setting the amplitude ratio of sound sources in the high-frequency dual-point sound source, so that a stronger leakage reduction ability may be obtained in the high-frequency band to meet the needs of open binaural acoustic output apparatus. According to FIG. 10A, a total leaked sound generated by a system composed of the two dual-point sound sources may be kept at a low level in a frequency range below 7000 Hz, and may be smaller than that of a single-point sound source.

Figure 10B:
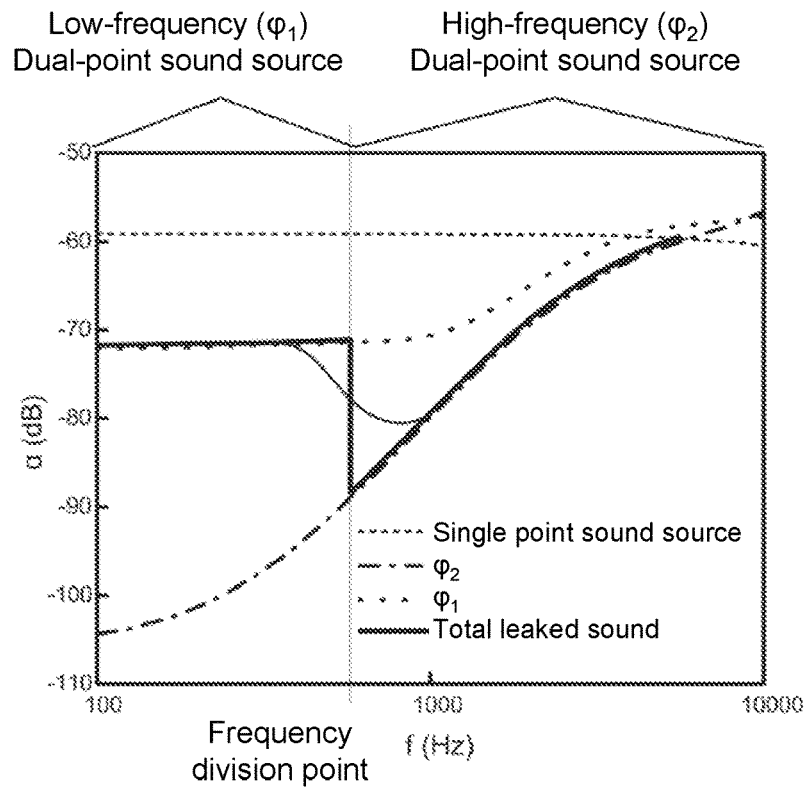
FIG. 10B is an exemplary graph of leaked sounds of an acoustic output apparatus with two dual-point sound sources according to some embodiments of the present disclosure.

As shown in FIG. 10B, compared to a single-point sound source, the leakage reduction ability may be improved by setting two dual-point sound sources with different phase differences. For example, a phase difference of the low-frequency dual-point sound source may be $\varphi_1$, and a phase difference of the high-frequency dual-point sound source may be $\varphi_2$. In the low-frequency band, after adjusting a phase difference of each dual-point sound source, an increase of the near-field hearing sound may be greater than an increase of the far-field leaked sound, which may produce a higher near-field hearing sound volume in the low-frequency range. Since in the low-frequency band, the far-field leaked sound of a dual-point sound source is originally very low, after adjusting the phase difference of the dual-point sound source, the slightly increased leaked sound may still be kept low. In the high-frequency range, $\varphi_2$ may be equal to or close to 180 degrees by setting the phase difference of sound sources of the high-frequency dual-point sound source, so that a stronger leakage reduction ability may be obtained in the high-frequency band to meet the needs of open binaural acoustic output apparatus.

It should be noted that curves of total reduced leaked sound in FIGS. 10A and 10B are ideal situations, and just to illustrate the principle and effect. Affected by one or more factors such as actual circuit filter characteristics, transducer frequency characteristics, and sound channel frequency characteristics, the actual output low-frequency sound and high-frequency sound may be different from sounds shown in FIGS. 10A and 10B. At the same time, a low-frequency sound and a high-frequency sound may have a certain overlap (aliasing) in a frequency band near the frequency division point, which may cause the actual total reduced leaked sound may not have a sudden change at the frequency division point as shown in FIG. 10A and/or FIG. 10B, but may have a gradual change and transition in the frequency band near the frequency division point (e.g., as shown by a thin solid line in FIG. 10A and/or FIG. 10B). It is understandable that these differences may not affect the overall sound leakage reduction effect of the acoustic output apparatus provided by the embodiments of the present disclosure.

Figure 10C:
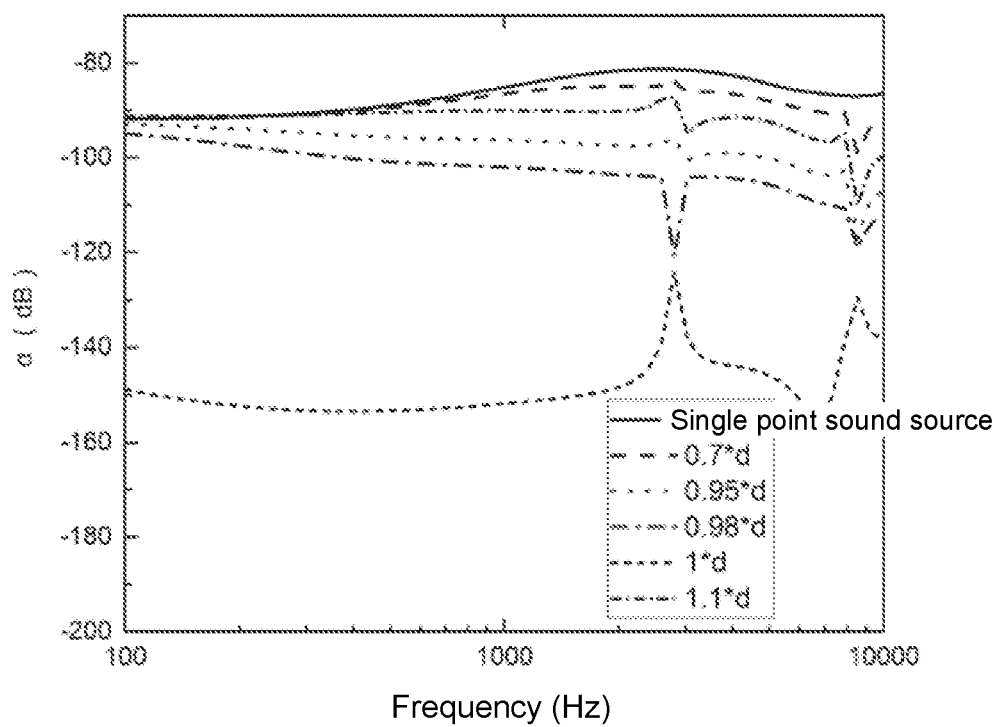
FIG. 10C is an exemplary graph of leaked sounds of an acoustic output apparatus with two dual-point sound sources according to some embodiments of the present disclosure.

FIG. 10C shows sound leakage reduction curves of a dual-point sound source under different diameter ratios of sound guiding tubes. As shown in FIG. 10C, within a certain frequency range (for example, in the range of 800 Hz-10 kHz), the leakage reduction ability of a dual-point sound source may be better than that of a single-point sound source. For example, when a diameter ratio of sound guiding tubes of the dual-point sound source is 1, the dual-point sound source may have a stronger sound leakage reduction ability. As another example, when the diameter ratio of the sound guiding tubes of the dual-point sound source is 1.1, the leakage reduction ability of the dual-point sound source may be better than that of the single-point sound source in the range of 800 Hz-10 kHz. As further an example, when the diameter ratio of the sound guiding tubes of the dual-point sound source is 0.95, the sound leakage reduction ability of the dual-point sound source may be still better than that of the single-point sound source.

Figure 10D:
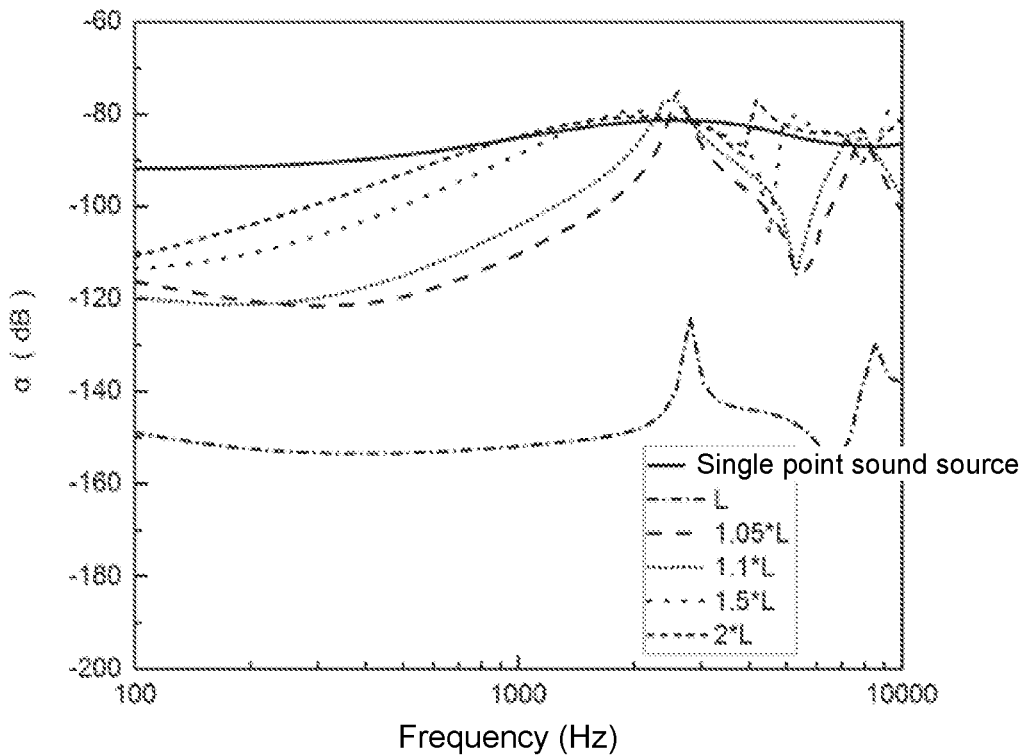
FIG. 10D is an exemplary graph of leaked sounds of an acoustic output apparatus with two dual-point sound sources according to some embodiments of the present disclosure.

FIG. 10D shows sound leakage reduction curves of a dual-point sound source under different length ratios of sound guiding tubes. As shown in FIG. 10D, in the range of 100 Hz-1 kHz, the leakage reduction ability of the dual-point sound source may be set to be better than a single-point sound source by adjusting a length ratio (i.e., a ratio of the length of a longer sound guiding tube to the length of a shorter sound guiding tube) of the sound guiding tubes of the dual-point sound source. For example, the length ratio may be 1, 1.05, 1.1, 1.5, 2, etc. In the range of 1 kHz-10 kHz, by adjusting the length ratio of the sound guiding tubes of the dual-point sound source close to or equal to 1, the leakage reduction ability of the dual-point sound source may be set to be better than a single-point sound source.

In some other embodiments, the sounds output by the dual-point sound source may also have other amplitudes, other phases, or other spacing relationships. In some alternative embodiments, the parameters of the dual-point sound source may be adjusted in other feasible ways to improve the acoustic output apparatus's ability to reduce far-field sound leakage, which is not limited in the present disclosure. For example, it may be set that the low-frequency acoustic driver only outputs sounds through one sound guiding hole (that is, it is equivalent to a single-point sound source), and the high-frequency acoustic driver still outputs sound through two sound guiding holes (that is, it is equivalent to a dual-point sound source). In some embodiments, multiple dual-point sound sources may also be used to output sound signals with different frequency components.

It should be noted that the foregoing description of the acoustic output apparatus is merely for example and description, and does not limit the scope of the present disclosure. For those skilled in the art, various modifications and changes may be made to the acoustic output apparatus under the guidance of the present disclosure. However, these modifications and changes are still within the scope of the present disclosure. For example, in order to cause the acoustic driver to obtain a stronger low-frequency effect in a low-frequency range below 300 Hz, the amplitude ratio of the point sound source with a greater amplitude and the point sound source with less amplitude of the low-frequency dual-point sound source may be adjusted to be greater, or the phase difference between the two point sound sources of the low-frequency dual-point sound source may be adjusted to closer to 0 degrees, so that the sound output effect of the low-frequency dual-point sound source may be close to the single-point sound source. As a result, the acoustic output apparatus may output low-frequency sounds to the environment to be louder, and may have the effect of enhancing the low-frequency components in the near-field hearing sound. As another example, a single point sound source may be directly set in the low-frequency band to enhance the low-frequency signal output of the acoustic output apparatus. As a further example, according to requirements of the actual near-field hearing sound and far-field leakage reduction, different dual-point sound sources may be set in different frequency bands. A count of frequency sub-bands may be two or more. A dual-point sound source corresponding to each frequency sub-band may be set based on one or a combination of the above methods.

Figure 11:
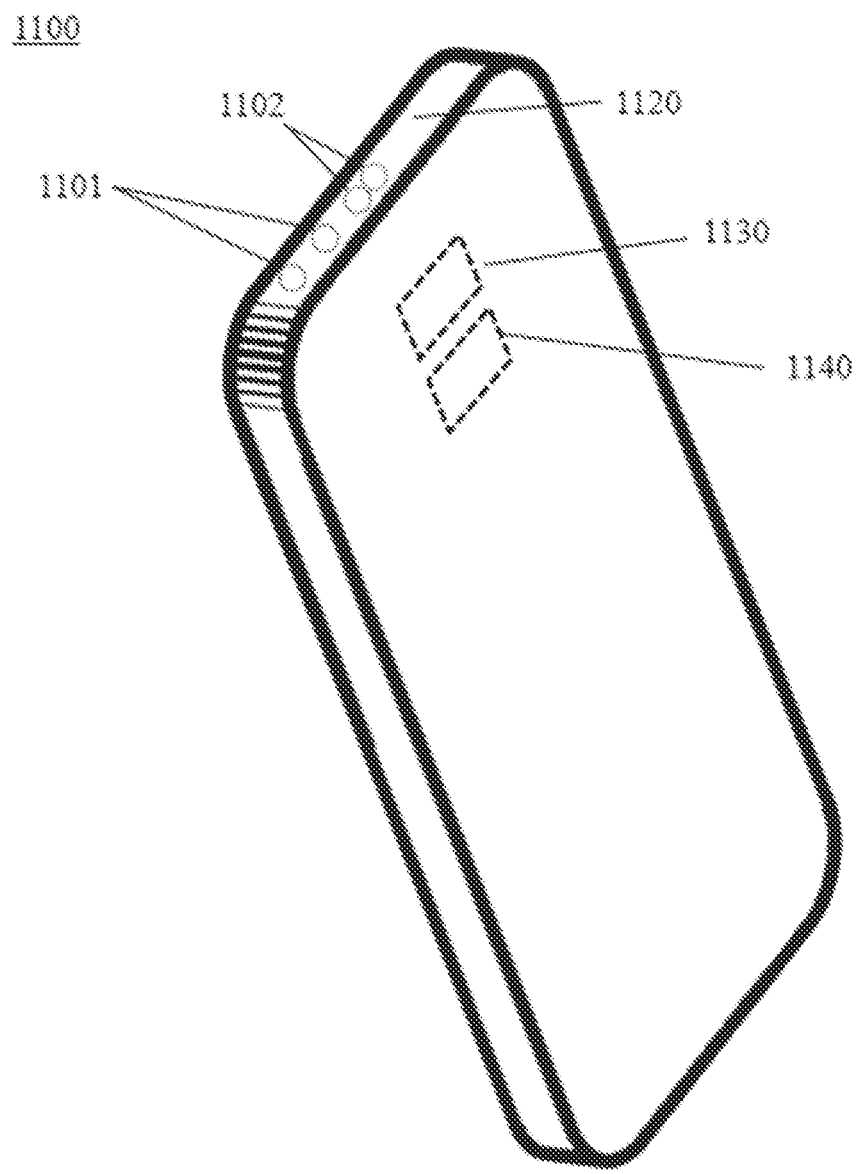
FIG. 11 is a schematic diagram illustrating a mobile phone with a plurality of sound guiding holes according to some embodiments of the present disclosure.

It needs to be known that the description of the present disclosure does not limit the actual use scenario of the acoustic output apparatus. The acoustic output apparatus may be any device or a part thereof that needs to output sound to a user. For example, the acoustic output apparatus may be applied on a mobile phone. FIG. 11 is a schematic diagram illustrating a mobile phone with a plurality of sound guiding holes according to some embodiments of the present disclosure. As shown in the figure, the top 1120 of the mobile phone 1100 (i.e., "vertical" to the upper-end face of the mobile phone display) is provided with a plurality of sound guiding holes as described elsewhere in the present disclosure. Merely by way of example, sound guiding holes 1101 may constitute a group of dual-point sound sources (or point sound source arrays) for outputting low-frequency sounds. Two sound guiding holes 1102 may form another group of dual-point sound sources (or point source arrays) for outputting high-frequency sounds. The distance of the sound guiding holes 1101 may be longer than the distance of the sound guiding holes 1102. A low-frequency acoustic driver 1130 and a high-frequency acoustic driver 1140 are provided inside the casing of the mobile phone 1100. The low-frequency sound generated by the low-frequency acoustic driver 1130 may be transmitted outward through the sound guiding holes 1101, and the high-frequency sound generated by the high-frequency acoustic driver 1140 may be transmitted outward through the sound guiding holes 1102. According to other embodiments described in the present disclosure, when the user places the sound guiding holes 1101 and 1102 near the ear to answer the voice information, the sound guiding holes 1101 and 1102 may emit a strong near-field sound to the user, and at the same time may reduce leakage to the surrounding environment. Moreover, by setting up the sound guiding hole on the top of the phone, instead of the upper part of the display of the mobile phone, the space required to set up the sound guiding hole on the front of the phone may be saved, then the area of the mobile phone display may be further increased, the appearance of the phone more may also be concise and beautiful.

The above description of setting the sound guiding hole on the mobile phone is just for the purposes of illustration. Without departing from the principle, those skilled in the art may make adjustments to the structure, and the adjusted structure may still be within the protection scope of the present disclosure. For example, all or part of the sound guiding holes 1101 or 1102 may also be set on other positions of the mobile phone 1100. For example, the upper part of the back shell, the upper part of the side shell, etc., and these settings may still ensure that the user hears a large volume when receiving the sound information, and also prevents the sound information from leaking to the surrounding environment. As another example, low-frequency acoustic driver 1130 and/or high-frequency acoustic driver 1140 may not be necessary, and may also divide the sound output by the mobile phone 1100 through other methods described in the present disclosure, which will not be repeated here.

Beneficial effects of the present disclosure may include but not limited to: (1) a high-frequency dual-point sound source and a low-frequency dual-point sound source may be provided to output sound in different frequency bands, thereby achieving better acoustic output effect; (2) by setting dual-point sound sources with different amplitude ratios, the acoustic output apparatus may have a stronger capability to reduce sound leakage in higher frequency bands, which may meet requirements for an open binaural acoustic output apparatus, thereby obtaining a good sound output effect in a quiet environment; (3) by setting dual-point sound sources with different phase differences, the acoustic output apparatus may have a higher hearing sound volume in lower frequency bands and have a stronger capability to reduce sound leakage in higher frequency bands, which may improve the sound output effect of the open binaural acoustic output apparatus. It should be noted that different embodiments may have different beneficial effects. In various embodiments, the acoustic output apparatus may have any one or a combination of the benefits exemplified above, and any other beneficial effects that can be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

Computer storage media may contain a transmitted data signal containing a computer program code, for example on baseband or as part of a carrier wave. The propagation signal may have multiple manifestations, including electromagnetic form, optical form, etc., or a suitable combination form. A computer storage medium may be any computer-readable medium other than a computer-readable storage medium, which may be connected to an instruction execution system, device, or device to enable communication, propagation, or transmission of a program for use. The program code located on a computer storage medium may be transmitted through any suitable medium, including radio, cable, fiber optic cable, RF, or similar media, or any combination of the media.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each patent, patent application, patent application publication and other materials cited herein, such as articles, books, instructions, publications, documents, etc., are hereby incorporated by reference in their entirety. Application history documents that are inconsistent or conflicting with the contents of the present disclosure are excluded, and documents (currently or later attached to the present disclosure) that limit the widest range of the scope of the present disclosure are also excluded. It is to be noted that if the description, definition, and/or terminology used in the appended application of the present disclosure is inconsistent or conflicting with the contents described in this application, the description, definition and/or terminology may be subject to the present disclosure.

At last, it should be understood that the embodiments described in the present disclosure are merely illustrative of the principles of the embodiments of the present disclosure. Other modifications that may be employed may be within the scope of the application. Thus, by way of example, but not of limitation, alternative configurations of the embodiments of the application may be utilized in accordance with the teachings herein. Accordingly, embodiments of the present disclosure are not limited to the embodiments that are expressly introduced and described herein.

What is claimed is:

1. An acoustic output apparatus, comprising:
at least one low-frequency acoustic driver that outputs sounds from at least two first sound guiding holes;
at least one high-frequency acoustic driver that outputs sounds from at least two second sound guiding holes; and
a support component configured to support the at least one high-frequency acoustic driver and the at least one low-frequency acoustic driver, and cause the at least two first sound guiding holes and the at least two second sound guiding holes to locate away from a position of an ear of a user, wherein
an amplitude ratio of the sounds output from the at least two first sound guiding holes is a first amplitude ratio, an amplitude ratio of the sounds output from the at least two second sound guiding holes is a second amplitude ratio, the first amplitude ratio exceeds the second amplitude ratio.

2. The acoustic output apparatus of claim 1, wherein the sounds output from the low-frequency acoustic driver are in a first frequency range, the sounds output from the high-frequency acoustic driver are in a second frequency range, the second frequency range includes frequencies higher than the first frequency range.

3. The acoustic output apparatus of claim 2, wherein the first frequency range includes frequencies less than 650 Hz, and the second frequency range includes frequencies exceeding 1000 Hz.

4. The acoustic output apparatus of claim 2, wherein the first frequency range and the second frequency range overlap.

5. The acoustic output apparatus of claim 1, wherein the at least two first sound guiding holes and the at least two second sound guiding holes are located on the support component.

6. The acoustic output apparatus of claim 1, wherein the first amplitude ratio and the second amplitude ratio are within a range of 1-1.5.

7. The acoustic output apparatus of claim 1, wherein
a first acoustic route from the at least one low-frequency acoustic driver to the at least two first sound guiding holes includes an acoustic resistance material, and the acoustic resistance material having an acoustic impedance and affects the first amplitude ratio; or,
a second acoustic route from the at least one high-frequency acoustic driver to the at least two second sound guiding holes includes an acoustic resistance material, the acoustic resistance material having an acoustic impedance and affects the second amplitude ratio.

8. The acoustic output apparatus of claim 7, wherein the at least one low-frequency acoustic driver is located in a first housing that defines a first front chamber and a first rear chamber of the at least one low-frequency acoustic driver, wherein
the first front chamber of the at least one low-frequency acoustic driver is acoustically coupled to one of the at least two first sound guiding holes, and
the first rear chamber of the at least one low-frequency acoustic driver is acoustically coupled to the other one of the at least two first sound guiding holes.

9. The acoustic output apparatus of claim 8, wherein the at least one high-frequency acoustic driver is located in a second housing that defines a second front chamber and a second rear chamber of the at least one high-frequency acoustic driver, wherein the second front chamber of the at least one high-frequency acoustic driver is acoustically coupled to one of the at least two second sound guiding holes, and the second rear chamber of the at least one high-frequency acoustic driver is acoustically coupled to the other one of the at least two second sound guiding holes.

10. The acoustic output apparatus of claim 9, wherein the first front chamber and the first rear chamber of the at least one low-frequency acoustic driver have different acoustic impedances, and the second front chamber and the second rear chamber of the at least one high-frequency acoustic driver have different acoustic impedances.

11. The acoustic output apparatus of claim 10, wherein an acoustic impedance ratio of the first front chamber and the first rear chamber of the at least one low-frequency acoustic driver exceeds an acoustic impedance ratio of the second front chamber and the second rear chamber of the at least one high-frequency acoustic driver.

12. The acoustic output apparatus of claim 11, wherein the acoustic impedance ratio of the first front chamber and the first rear chamber of the at least one low-frequency acoustic driver is in a range of 0.8-1.2.

13. The acoustic output apparatus of claim 7, wherein the first acoustic route includes at least one of a sound guiding tube, a sound cavity, a resonant cavity, a sound hole, a sound slit, or a tuning network.

14. The acoustic output apparatus of claim 13, wherein a diameter of the sound guiding tube corresponding to the first acoustic route is not less than 1.5 mm.

15. The acoustic output apparatus of claim 13, wherein a diameter of the sound guiding tube corresponding to the first acoustic route is not greater than 10 mm.

16. The acoustic output apparatus of claim 13, wherein a length of the sound guiding tube in the acoustic output apparatus is not greater than 100 mm.

17. The acoustic output apparatus of claim 1, wherein a phase difference of the sounds output from the at least two first sound guiding holes is a first phase difference, a phase difference of the sounds output from the at least two second sound guiding holes is a second phase difference, an absolute value of the first phase difference is less than an absolute value of the second phase difference.

18. The acoustic output apparatus of claim 17, wherein the absolute value of the first phase difference is within a range of 160-180 degrees, and the absolute value of the second phase difference is within a range of 170-180 degrees.

19. The acoustic output apparatus of claim 17, wherein the at least one low-frequency acoustic driver outputs the sounds from the at least two first sound guiding holes based on different sound paths, and the at least one high-frequency acoustic driver outputs the sounds from the at least two second sound guiding holes based on different sound paths.

20. The acoustic output apparatus of claim 19, wherein a ratio of the sound paths of the at least one low-frequency acoustic driver acoustically coupled to the at least two first sound guiding holes is in the range of 0.5-2.

* * * * *